United States Patent
Tanaka et al.

(10) Patent No.: US 7,576,779 B2
(45) Date of Patent: Aug. 18, 2009

(54) CONTROL APPARATUS AND CONTROLLED APPARATUS UTILIZED IN SYSTEM SUPPORTING BOTH COMMAND-BASED MODEL AND USER-INTERFACE EXPORT MODEL, CONTROL SYSTEM AND COMPUTER USED IN SAID SYSTEM

(75) Inventors: Hiroshi Tanaka, Asaka (JP); Hisayoshi Tsubaki, Asaka (JP)

(73) Assignee: Fujifilm Corporation, Tokyo (JP)

( * ) Notice: Subject to any disclaimer, the term of this patent is extended or adjusted under 35 U.S.C. 154(b) by 620 days.

(21) Appl. No.: 10/882,280

(22) Filed: Jul. 2, 2004

(65) Prior Publication Data

US 2005/0007617 A1 Jan. 13, 2005

(30) Foreign Application Priority Data

Jul. 7, 2003 (JP) ............................. 2003-192517
Aug. 29, 2003 (JP) ............................. 2003-305910

(51) Int. Cl.
*H04N 5/225* (2006.01)
*H04N 5/232* (2006.01)

(52) U.S. Cl. .............. 348/211.4; 348/207.2; 348/211.1; 348/211.2; 348/211.3

(58) Field of Classification Search .............. 348/207.2, 348/211.4, 321.3, 231.3, 211.99, 211.11, 348/211.2, 211.3, 211.5, 211.6; 358/1.15, 358/1.1, 1.16; 700/230, 228, 220, 238
See application file for complete search history.

(56) References Cited

U.S. PATENT DOCUMENTS

| | | | |
|---|---|---|---|
| 6,603,506 B2 * | 8/2003 | Ogawa et al. ............ | 348/207.2 |
| 6,952,222 B2 * | 10/2005 | Sekine .................... | 348/207.2 |
| 7,072,056 B1 * | 7/2006 | Greaves et al. ............. | 358/1.15 |
| 7,191,236 B2 * | 3/2007 | Simpson-Young et al. .. | 709/228 |
| 7,236,185 B2 * | 6/2007 | Terada et al. ........... | 348/207.11 |
| 2002/0004802 A1 | 1/2002 | Shima | |
| 2002/0029277 A1 | 3/2002 | Simpson-Young et al. | |
| 2002/0080250 A1 | 6/2002 | Ogawa et al. | |

FOREIGN PATENT DOCUMENTS

| | | | |
|---|---|---|---|
| JP | 10-65867 | A | 3/1998 |
| JP | 10-224676 | A | 8/1998 |
| JP | 10-326288 | A | 12/1998 |
| JP | 11-53142 | A | 2/1999 |
| JP | 2001-222318 | A | 8/2001 |
| JP | 2002-55896 | A | 2/2002 |
| JP | 2002-123458 | A | 4/2002 |
| JP | 2002-169671 | A | 6/2002 |
| JP | 2003-186631 | A | 7/2003 |

* cited by examiner

*Primary Examiner*—David L Ometz
*Assistant Examiner*—Peter Chon
(74) *Attorney, Agent, or Firm*—Birch, Stewart, Kolasch and Birch, LLP

(57) ABSTRACT

Commands regarding printing of a plurality of types are stored in a non-volatile memory of a digital still camera and in a non-volatile memory of a printer. Print processing is executed by a command-based model with regard to types of printing for which commands are held in common by the digital still camera and printer. With regard to print processing for which the digital still camera does not possess the command, the digital still camera is made to function as a client and the printer as a server, whereby the print processing is executed by a user-interface export model.

10 Claims, 25 Drawing Sheets

*Fig. 7*

|  | DIGITAL STILL CAMERA | PRINTER (NC-100) |
|---|---|---|
| SUPPORTED PRINT TYPES | STANDARD PRINT | STANDARD PRINT |
|  | MULTI-PRINT 2-UP |  |
|  | MULTI-PRINT 4-UP | MULTI-PRINT 4-UP |
|  |  | MULTI-PRINT 9-UP |
|  |  | MULTI-PRINT 16-UP |
|  |  | INDEX PRINT |
| SUPPORTED PAPER SIZES | NONE (CANNOT BE SPECIFIED) | L SIZE |
|  |  | 2L SIZE |

*Fig. 13*

```
<printer-capability>
  <device-info>
    <vendor>Acompany</vendor>      ····· NAME OF PRINTER MANUFACTURE
    <name>NC-100</name>            ····· NAME OF PRINTER MODEL
  </device-info>
  <capability>
    <print-type>
      <standard-print/>
      <multi-print N-up="4"/>
      <multi-print N-up="9"/>       ⎫
      <multi-print N-up="16"/>      ⎬ SUPPORTED PRINT TYPES
      <index-print/>                ⎭
    </print-type>
    <paper-size>
      <L/>                          ⎫
      <2L/>                         ⎬ SUPPORTED PRINTING PAPER
    </paper-size>                   ⎭
  </capability>
</printer-capability>
```

Fig. 24

PRINT SPECIFYING INFORMATION (WEB-BASED ARCHITECTURE)

http://xxx.OOO.△△△/print.cgi?frame=DSCF0001.JPG & pnum=3 & psize=A4

| LINE NUMBER | | |
|---|---|---|
| 1 | JOB START | |
| 2 | PRT PID=1 | |
| 3 | PRT QTY=3 | |
| 4 | PRT SIZ=A4 | |
| 5 | IMG SRC=DSCF0001.JPG | |
| 6 | JOB END | |

PRINT SPECIFYING INFORMATION
(COMMAND-BASED ARCHITECTURE)

*Fig. 27*

```
<html>

<head>
<title>SPECIFY PRINT</title>
</head>

<body>

<p><b><font size="5"> SPECIFY PRINT </font></b></p>
<font size="4">FILE NAME         
</font><input type="text" name="fname"size="27"></p>
<p style="margin-left:30"><font size="4">NUMBER OF PRINTS      
</font><select size="1" name="pnum">
<option selected>1</option>
<option>2</option>
<option>3</option>
<option>4</option>
<option>5</option>          ⎫
<option>6</option>           ⎬ SELECTION OF NUMBER OF PRINTS
<option>7</option>          ⎭
<option>8</option>
<option>9</option>
<option>10</option>
</select> 枚</p>
<p style="margin-left:"30"><font size="4">PRINT SIZE     
</font><select size="1" name="psize">
<option>POSTCARD</option>
<option> L SIZE</option>        ⎫ SELECTION
<option selected>A4</option>    ⎬ OF PRINT SIZE
<option>B5</option>             ⎭
</select>  </p>

<input type="submit" value="TRANSMIT" name="OK">
<input type="reset" value="Cancel" name="B2"></p>
</body>
</html>
```

CONTROL APPARATUS AND CONTROLLED APPARATUS UTILIZED IN SYSTEM SUPPORTING BOTH COMMAND-BASED MODEL AND USER-INTERFACE EXPORT MODEL, CONTROL SYSTEM AND COMPUTER USED IN SAID SYSTEM

This Nonprovisional application claims priority under 35 U.S.C. § 119(a) on Patent Application No(s). 2003-192517 and 2003-305910 filed in Japan on Jul. 7, 2003 and Aug. 29, 2003, respectively, the entire contents of which are hereby incorporated by reference.

BACKGROUND OF THE INVENTION

1. Field of the Invention

This invention relates to a control apparatus and controlled apparatus utilized in a system that supports both a command-based model and a user-interface export model, a control system and a computer used in this control system.

2. Description of the Related Art

A direct print system based upon a command-based model is known in the art and comprises a digital still camera and a printer. In this system, commands for executing print processing are transmitted from the digital still camera to the printer. The printer is equipped with commands transmitted from the digital still camera (or with a program or data for interpreting commands transmitted from the digital still camera). The printer is controlled based upon the command for print processing transmitted to the printer from the digital still camera.

A direct print system based upon a command-based model is such that if all print processing functions of the printer are caused to be implemented by commands transmitted from the digital still camera (i.e., a control apparatus) to the printer (i.e., a controlled apparatus), then it is required that commands corresponding to all of the print processing functions of the printer be prepared (stored) in the digital still camera in advance. If the printer has a special print processing function other than the print processing functions based upon commands that have been stored in the digital still camera, then the printer cannot have its special function controlled by the command-based model.

Further, the print functions for which processing can be implemented by a printer generally differ depending upon the printer model (type). In order to make it possible for the user of a digital still camera to make full use of print functions that differ from printer to printer, it is required that commands that support the print functions be stored in the digital still camera beforehand for every model (type) of printer. This, however, is unrealistic.

The specification of Japanese Patent Application Laid-Open No. 10-224676 describes a digital still camera that includes a WWW server/client unit. The WWW server/client unit is connected to a remotely located data processing unit via a radio unit in response to an instruction from an operator and either transmits digital image data and voice data stored in a storage unit to the remotely located data processing unit or receives digital image data and voice data from the remotely located data processing unit and stores this data in the storage unit. It is possible to control the data processing unit (e.g., a printer) in the digital still camera even by the WWW server/client scheme.

The WWW server/client unit scheme, however, involves a system that is more complicated in comparison with a command-based model. For example, transactions are performed a large number of times. As a consequence, even simple print processing such as printing of single frames involves a great deal of processing.

A control system for controlling a controlled apparatus such as a surveillance camera by using an HTML screen at a control apparatus has been proposed (e.g., see the specification of Japanese Patent Application Laid-Open No. 2001-222318). This system is premised on the fact that the functions of the surveillance camera are grasped by the control apparatus in advance.

DISCLOSURE OF THE INVENTION

Accordingly, an object of the present invention is to arrange it so that a controlled apparatus can be controlled by a command-based model with regard to a function (processing) controllable by the command-based model and so that a controlled apparatus can be controlled even if it has a function (processing) that cannot be controlled by the command-based model.

Another object of the present invention is to arrange it so that a controlled apparatus, which is controlled by a command, can be controlled even if a control apparatus that controls the controlled apparatus has not stored (grasped) the command.

A further object of the present invention is to arrange it so that processing functions of a controlled apparatus controlled by commands can be used exploited sufficiently.

A further object of the present invention is to arrange it so that processing functions of a controlled apparatus controlled by commands can be grasped in the control apparatus.

According to a first aspect of the present invention, the foregoing objects are attained by providing a control apparatus utilized in a system constituted by the control apparatus and a controlled apparatus that support both a command-based model and a user-interface export model.

The control apparatus according to the first aspect of the present invention comprises: first storage means for storing commands for controlling the controlled apparatus by the command-based model; second storage means for storing control-apparatus support command script representing types of commands that have been stored in the first storage means; receiving means for receiving controlled-apparatus support command script, which represents types of commands executable in the controlled apparatus, transmitted from the controlled apparatus; display control means for displaying types of processing executable by the controlled apparatus on a display unit based upon the controlled-apparatus support command script received by the receiving means; selecting means for accepting input of selection of processing of any type from among the types of processing executable by the controlled apparatus displayed on the display unit by the display control means; determination means for determining, based upon the control-apparatus support command script that has been stored in the second storage means and the controlled-apparatus support command script that has been received by the receiving means, whether processing that has been selected by the selecting means is processing capable of being executed by the command-based model; command processing control means for causing the controlled apparatus to execute the processing of the selected type by transmitting a command, which corresponds to the processing of the selected type, stored in the first storage means to the controlled apparatus if the determination means has determined that the processing selected by the selecting means is processing that can be executed by the command-based model; and user-interface processing control means for causing the controlled apparatus to execute the processing of the selected type by causing the control apparatus and the controlled apparatus to be operated by the user-interface export model and transmitting user-interface export data, which corresponds to the processing of the selected type, to the controlled apparatus if the determination means has determined that the processing selected by the selecting means is processing that cannot be executed by the command-based model.

With the command-based model, the controlled apparatus is controlled based upon a command transmitted from the control apparatus to the controlled apparatus. The controlled apparatus analyzes the command transmitted to it from the control apparatus and executes processing that is based upon the command. With the command-based model, the control apparatus and the controlled apparatus operate in accordance with definitions (agreements) relating to predetermined commands.

With the user-interface export model, on the other hand, the control apparatus functions as a client and the controlled apparatus functions as a server. The controlled apparatus is controlled based upon data (referred to as user-interface export data) that is input in the control apparatus (the client). With the user-interface export model, user-interface export data is input to the control apparatus (client) in accordance with a page transmitted from the controlled apparatus (server) to the control apparatus (client). The content of data (user-interface export data) transmitted from the control apparatus to the controlled apparatus is based upon a page transmitted from the control apparatus to the controlled apparatus. As a result, the controlled apparatus is capable of accepting (receiving) data required by the controlled apparatus from the control apparatus. Definitions (agreements) for controlling the controlled apparatus need not be decided in advance between the control apparatus (client) and the controlled apparatus (server) in regard to the user-interface export data.

The control apparatus includes the first storage means for storing commands for controlling the controlled apparatus by the command-based model, and the second storage means for storing the control-apparatus support command script representing types of commands that have been stored in the first storage means. The types of commands that have been stored in the first storage means of the controlled apparatus are indicated by the control-apparatus support command script.

Controlled-apparatus support command script representing types of commands executable in the controlled apparatus is transmitted from the controlled apparatus to the control apparatus and is received by the control apparatus. An executable command signifies a command that is capable of being interpreted in the controlled apparatus. If an executable command is accepted (received), the controlled apparatus executes processing that is based upon the accepted command.

Types of processing executable by the controlled apparatus are displayed by display means based upon the received controlled-apparatus support command script.

The operator of the control apparatus selects the desired type of processing from the displayed types of processing executable by the controlled apparatus.

Whether the selected processing is capable of being executed by the command-based model is determined based upon the control-apparatus support command script and controlled-apparatus support command script.

Thus, the control-apparatus support command script represents the types of commands that have been stored in the first storage means of the control apparatus, and the controlled-apparatus support command script represents the types of commands executable in the controlled apparatus.

With regard to common commands among the types of commands in the control-apparatus support command script, the commands can be transmitted from the control apparatus to the controlled apparatus, the commands can be analyzed in the controlled apparatus and the controlled apparatus can execute processing based upon the commands. In other words, processing by the command-based model is possible.

In a case where selected processing is determined to be processing that can be executed by the command-based model, the command corresponding to the selected type of processing that has been stored in the first storage means is transmitted to the controlled apparatus, where the processing of the selected type is executed.

In a case where selected processing is determined to be processing that cannot be executed by the command-based model, i.e., in a case where the command corresponding to the selected processing has not been stored in the first storage means of the control apparatus, the control apparatus and controlled apparatus are operated by the user-interface export model. User-interface export data corresponding to the selected type of processing is transmitted from the control apparatus to the controlled apparatus, whereby the selected type of processing is executed in the controlled apparatus.

For example, in a case where it has been determined that selected processing is processing that cannot be executed by the command-based model, page request data is transmitted from the control apparatus to the controlled apparatus, whereby the controlled apparatus is made to recognize the fact that processing based upon the user-interface export model will be executed, and user-interface export data that is entered in accordance with a page based upon the page data transmitted from the controlled apparatus to the control apparatus is transmitted from the control apparatus to the controlled apparatus.

In accordance with the first aspect of the present invention, the control apparatus and controlled apparatus operate based upon the command-based model with regard to processing executable by a command. With regard to processing that the controlled apparatus cannot be made to execute in the command-based model, the control apparatus and the controlled apparatus are operated by the user-interface export model. Even if all commands for controlling the controlled apparatus have not been stored in the first storage means of the control apparatus, the controlled apparatus can be controlled by the user-interface export model. This makes it possible to exploit the functions of the controlled apparatus effectively.

With regard to complicated processing, setting agreements (definitions and protocols) based upon the command-based model for both the control apparatus and controlled apparatus is comparatively difficult or complex. With regard to comparatively simple processing, therefore, setting agreements based upon the command-based model for both the control apparatus and controlled apparatus is realistic. With regard to comparatively simple processing, the processing is executed by the command-based model. It would suffice to adopt the user-interface export model with regard to complicated processing.

According to a second aspect of the present invention, the foregoing objects are attained by providing a controlled apparatus utilized in a system constituted by a control apparatus and the controlled apparatus that support both a command-based model and a user-interface export model.

The controlled apparatus according to the second aspect of the present invention comprises: command receiving means for receiving commands transmitted from the control apparatus; command processing execution means for executing processing that is based upon a command received by the command receiving means; page request data receiving means for receiving page request data transmitted from the control apparatus; page data transmitting means for transmitting page data to the control apparatus in response to receipt of the page request data by the page request data receiving means; user-interface export data receiving means for receiving user-interface export data transmitted from the control apparatus in accordance with a page based upon the page data; and user-interface processing execution means for executing processing that is based upon the user-interface export data that has been received by the user-interface export data receiving means. If a command has been transmitted from the control apparatus, processing based upon the command is executed. If page request data has been transmitted from the control apparatus, the page data for entering user-interface export data is transmitted to the control apparatus. Processing that is based upon the user-interface export data input and transmitted in accordance with the page based upon the page data in the control apparatus is executed in the controlled apparatus.

The present invention further provides a program for controlling the above-described control apparatus.

According to a third aspect of the present invention, the foregoing objects are attained by providing a control system comprising a control apparatus, a converting server and a controlled apparatus for executing processing that is based upon processing-request command data of a command architecture.

The control apparatus is an apparatus for controlling the controlled apparatus, and the controlled apparatus is controlled by the control apparatus.

The controlled apparatus includes processing function data transmitting means for transmitting data, which represents processing functions capable of being executed by the controlled apparatus, to the converting server. The converting server includes: processing function data receiving means for receiving processing function data transmitted from the controlled apparatus; page data generating means for generating data, which represents a web page for selecting processing to be executed by the controlled apparatus, based upon the processing function data received by the processing function data receiving means; and page data transmitting means for transmitting processing-request selection page data, which has been generated by the page data generating means, to the control apparatus. The control apparatus includes: page data receiving means for receiving processing-request selection page data received from the converting server; display control means for displaying a processing-request selection page, which is based upon the processing-request selection page data received by the page data receiving means, on a display screen of a display unit; input means for accepting input of a processing request selected using by using the processing-request selection page displayed on the display screen by the display control means; and processing-request web data transmitting means for transmitting web data, which represents the selected processing request accepted by the input means, to the converting server. The converting server further includes processing-request web data receiving means for receiving processing-request web data transmitted from the control apparatus; converting means for converting processing-request web data, which has been received by the processing-request web data receiving means, to data of the command architecture; and processing-request command data transmitting means for transmitting the processing-request command data, which has been converted by the converting means, to the controlled apparatus.

The converting server in the third aspect of the present invention is provided on a communication path between the control apparatus and the controlled apparatus. Of course, this does not impede direction communication between the control apparatus and the controlled apparatus.

The converting server executes the following processing with respect to data transmitted from the controlled apparatus to the control apparatus and to data transmitted from the control apparatus to the controlled apparatus.

One process is a process for generating data, which represents a web page for selecting processing to be executed by the controlled apparatus, based upon processing function data transmitted from the controlled apparatus and representing processing functions capable of being executed by the controlled apparatus. Since the web page (processing-request selection page) generated is based upon the processing function data transmitted from the controlled apparatus, the web page indicates what processing is possible in the controlled apparatus. The control apparatus (the user) can grasp by the processing-request selection page what processing the controlled apparatus is capable of and can select processing to be executed by the controlled apparatus.

A second process is a process for converting the processing-request web data transmitted from the control apparatus to data of the command architecture.

The controlled apparatus executes processing based upon processing-request command data of the command architecture. The processing-request web data transmitted from the control apparatus is converted to the command architecture in the converting server and serves as the processing-request command data. If the processing-request command data is applied to the controlled apparatus, the latter executes processing that is based upon the processing-request command data. In other words, processing corresponding to a processing request selected using the processing-request selection page in the control apparatus can be executed by the controlled apparatus.

In accordance with the third aspect of the present invention, processing to be executed by the controlled apparatus is selected using a processing-request selection page that is based upon processing function data transmitted from the controlled apparatus. As a result, the processing functions possessed by the controlled apparatus can be used with sufficient skill. Further, processing-request web data (which has a web-data command architecture) transmitted from the control apparatus is converted to processing-request command data (which has a command architecture) in the converter server, and the processing-request command data obtained by the conversion is transmitted to the controlled apparatus. As a result, it is unnecessary for commands for controlling the controlled apparatus to be stored in (grasped by) the control apparatus.

The third aspect of the present invention is particularly effective in a case where a plurality of types of controlled apparatus are controlled by the control apparatus and processing functions that can be executed by the controlled apparatus differ from type to type of controlled apparatus. Regardless of the type of controlled apparatus, the processing functions capable of being executed by the controlled apparatus can be grasped by the control apparatus and the control apparatus can control the controlled apparatus in such a manner that a desired processing function among the processing functions will be executed in the controlled apparatus.

In one embodiment, the control apparatus further includes processing-target data transmitting means for transmitting processing-target data, which is to be processed in the controlled apparatus in accordance with the processing-request command data, to the converting server, and the converting server further includes processing-target data receiving means for receiving processing-target data transmitted from the control apparatus, and processing-target data transmitting means for transmitting the processing-target data, which has been received by the processing-target data receiving means, to the controlled apparatus. Processing that has been selected in the control apparatus by using the processing-request selection page can be applied in the controlled apparatus to the processing-target data applied to the controlled apparatus from the control apparatus via the converting server.

According to a fourth aspect of the present invention, the foregoing objects are attained by a converting server (computer) that constitutes the above-described control system. The computer according to the fourth aspect of the present invention comprises: processing function data receiving means for receiving data, which represents processing functions capable of being executed by a controlled apparatus, transmitted from the controlled apparatus for executing processing that is based upon processing-request command data of a command architecture; page data generating means for generating data, which represents a web page for selecting processing to be executed by the controlled apparatus, based upon the processing function data received by the processing function data receiving means; page data transmitting means for transmitting processing-request selection page data, which has been generated by the page data generating means, to the control apparatus; processing-request web data receiving means for receiving web data, which represents a processing request selected by using the processing-request selection web page, transmitted from the control apparatus; converting means for converting processing-request web data, which has been received by the processing-request web data receiving means, to data of the command architecture; and processing-request command data transmitting means for transmitting the processing-request command data, which has been converted by the converting means, to the controlled apparatus.

Thus, the computer generates data, which represents a web page for selecting processing to be executed by the controlled apparatus, based upon processing function data, which represents the processing function capable of being executed by the controlled apparatus, transmitted from the controlled apparatus. Since the web page (processing-request selection page) generated is based upon the processing function data transmitted from the controlled apparatus, the web page indicates what processing is possible in the controlled apparatus. The control apparatus can grasp by the processing-request selection page what processing the controlled apparatus is capable of and can select processing to be executed by the controlled apparatus from this processing. Further, processing-request data transmitted from the control apparatus is converted to the command architecture and serves as the processing-request command data. The processing-request command data is applied to the controlled apparatus. Processing based upon the processing-request command data can be executed in the controlled apparatus. Thus the control apparatus can be adapted to make more skilled use of the processing functions possessed by the controlled apparatus.

Another computer according to a fifth aspect of the present invention comprises: receiving means for receiving data, which represents processing functions capable of being executed by a controlled apparatus, transmitted from the controlled apparatus for executing processing that is based upon processing-request command data of a command architecture; page data generating means for generating data, which represents a web page for displaying content of processing capable of being executed by the controlled apparatus, based upon the processing function data received by the receiving means; and page data transmitting means for transmitting processing-content page data, which has been generated by the page data generating means, to a control apparatus. Even if the control apparatus is one that does not possess (cannot grasp) data having a command architecture, the processing functions capable of being executed by the controlled apparatus can be indicated by the web data. The processing functions executable by the controlled apparatus can be ascertained in the control apparatus.

Another computer according to a sixth aspect of the present invention comprises: receiving means for receiving web data, which represents a processing request for controlling a controlled apparatus, transmitted from a control apparatus; converting means for converting the processing-request web data, which has been received by the receiving means, to data of a command architecture; and transmitting means for transmitting the processing-request command data, which has been converted by the converting means, to the controlled apparatus for executing processing that is based upon the processing-request command data of the command architecture. Even if the control apparatus is one that does not possess (cannot grasp) data having a command architecture for controlling the controlled apparatus, the control apparatus can control the controlled apparatus.

The present invention also provides control methods suited to the above-described computers.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 illustrates supported print types and supported paper sizes with regard to a digital still camera and printer;

FIG. 13 illustrates an example of capability script;

FIG. 24 illustrates print specifying information of a web-based architecture and print specifying information of a command-based architecture;

FIG. 27 illustrates an example of print-specifying page data; and

DESCRIPTION OF THE PREFERRED EMBODIMENTS (1) First Embodiment

Figure 1:
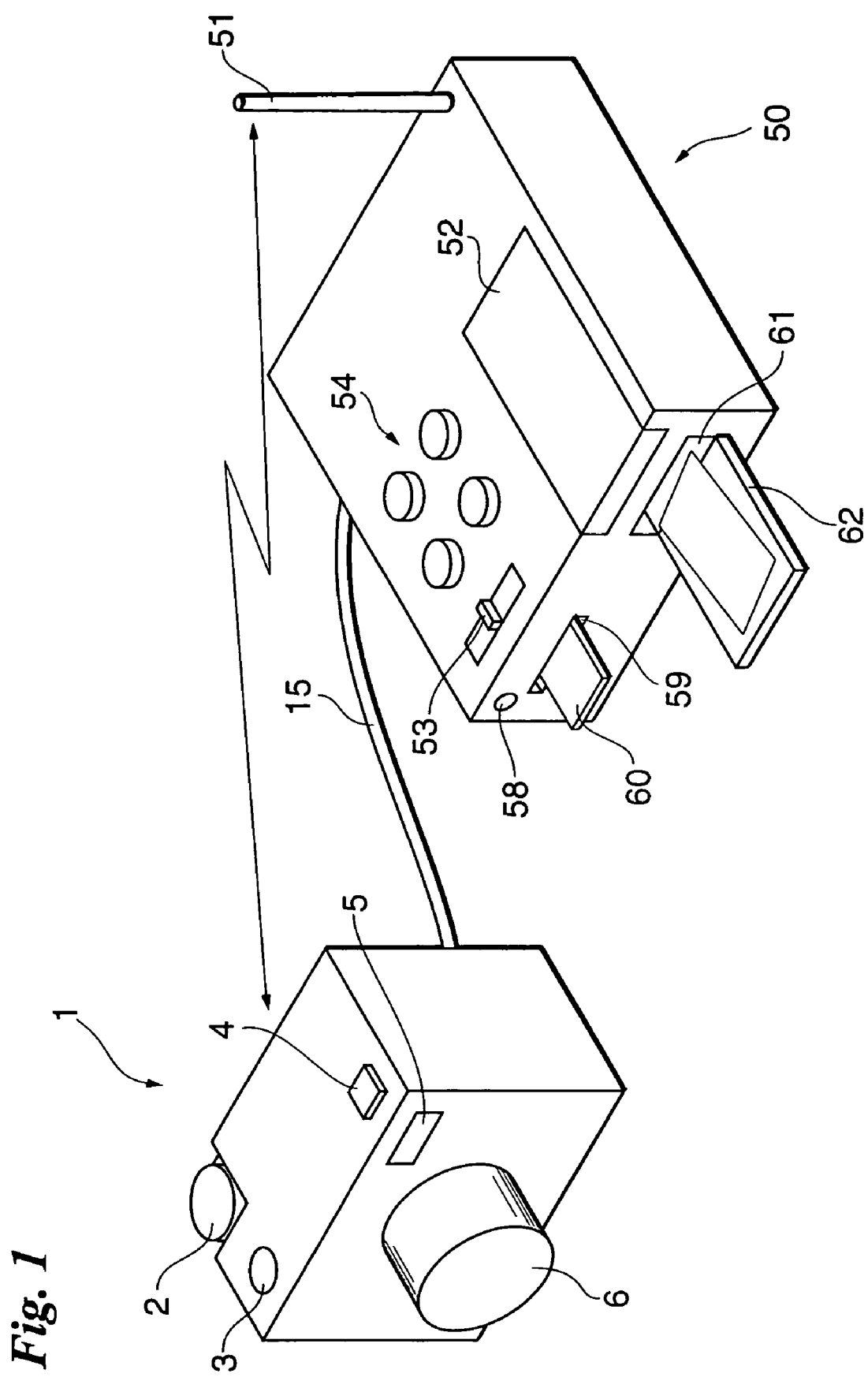
FIG. 1 is a diagram illustrating the overall appearance of a direct print system.

FIG. 1 illustrates a direct print system.

As shown in FIG. 1, the direct print system comprises a digital still camera 1 and a printer 50 capable of communicating with each other. The digital still camera 1 and printer 50 are connected wirelessly or by wire [a USB (Universal Serial Bus) cable 15] so as to be capable of communicating with each other.

The top side of the digital still camera 1 is provided with a mode selection dial 2 and shutter-release button 3 located on the left side as seen from the front of the camera. The right side as seen from the front of the camera 1 is provided with a radio communication antenna 4.

The front side of the digital still camera 1 is provided substantially at the center thereof with an imaging unit 6 that includes a lens. An electronic flash device 5 is provided at the upper-right corner of the camera.

The top side of the printer 50 is provided with radio communication antenna 51 at the upper-right corner thereof as seen from the front. Provided at the lower right is a removable cover 52 for dealing with problems such as jamming of printing paper. A mode selection slide switch 53 and a group 54 of various switches are provided on the top of the printer 50 on the left side thereof.

A power lamp 58 is provided on the top side of the printer 50 at the upper-left corner thereof. A card slot 59 is provided underneath the power lamp 58, and a memory card 60 is capable of being removably inserted into the card slot 59. A printing paper ejection port 61 is provided on the front of the printer 50 on the right side thereof. A tray 62 for accepting printing paper ejected from the printing paper ejection port 61 is provided on the front of the printer 50 in a form projecting from the printing paper ejection port 61.

Figure 2A:
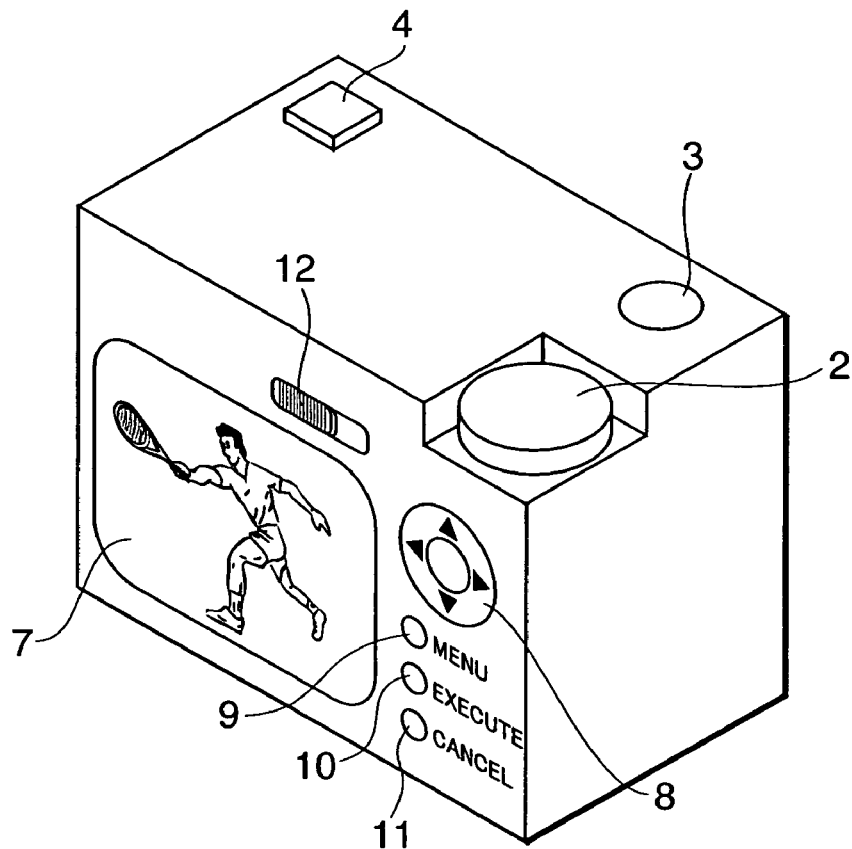
FIG. 2A illustrates the back side of a digital still camera and FIG. 2B a mode selection dial.
Figure 2B:
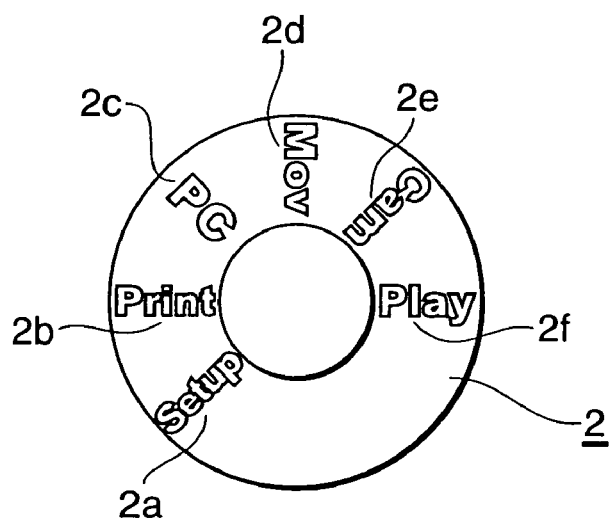

FIG. 2A illustrates the back side of the digital still camera 1, and FIG. 2B is an enlarge plan view of the mode selection dial 2.

A display screen (LCD) 7 is provided on the back side of the digital still camera 1 substantially at the center thereof. Displayed on the display screen 7 are an image captured by the imaging unit 6, an image represented by image data read out of the memory card inserted into the digital still camera 1, and an image for making various settings relative to the digital still camera 1. The display screen 7 functions also as a touch-sensitive panel (input device).

A power switch 12 is provided above the display screen 7. Provided on the right side of the display screen 7 are an up, down, left, right key 8 utilized to select a frame to be displayed on the display screen 7 and to make various settings, a menu button 9, an execute button 10 and a cancel button 11.

The mode selection dial 2 is provided on the digital still camera 1 in rotatable fashion. Any of a set-up mode (Setup) 2a, print mode (Print) 2b, PC mode (PC) 2c, movie mode (Mov) 2d, camera (photography) mode (Cam) 2e and playback mode (Play) 2f are selected by the mode selection dial 2. The set-up mode 2a is selected if an initial setting, etc., is to be made, the print mode 2b if direct printing is to be performed, the PC mode 2c if data is to be sent and received to and from a personal computer, the movie mode 2d if a moving picture (movie) is to be shot, the camera mode 2e if a still picture is to be taken, and the playback mode 2f if a moving picture or still picture is to be played back.

Figure 3:
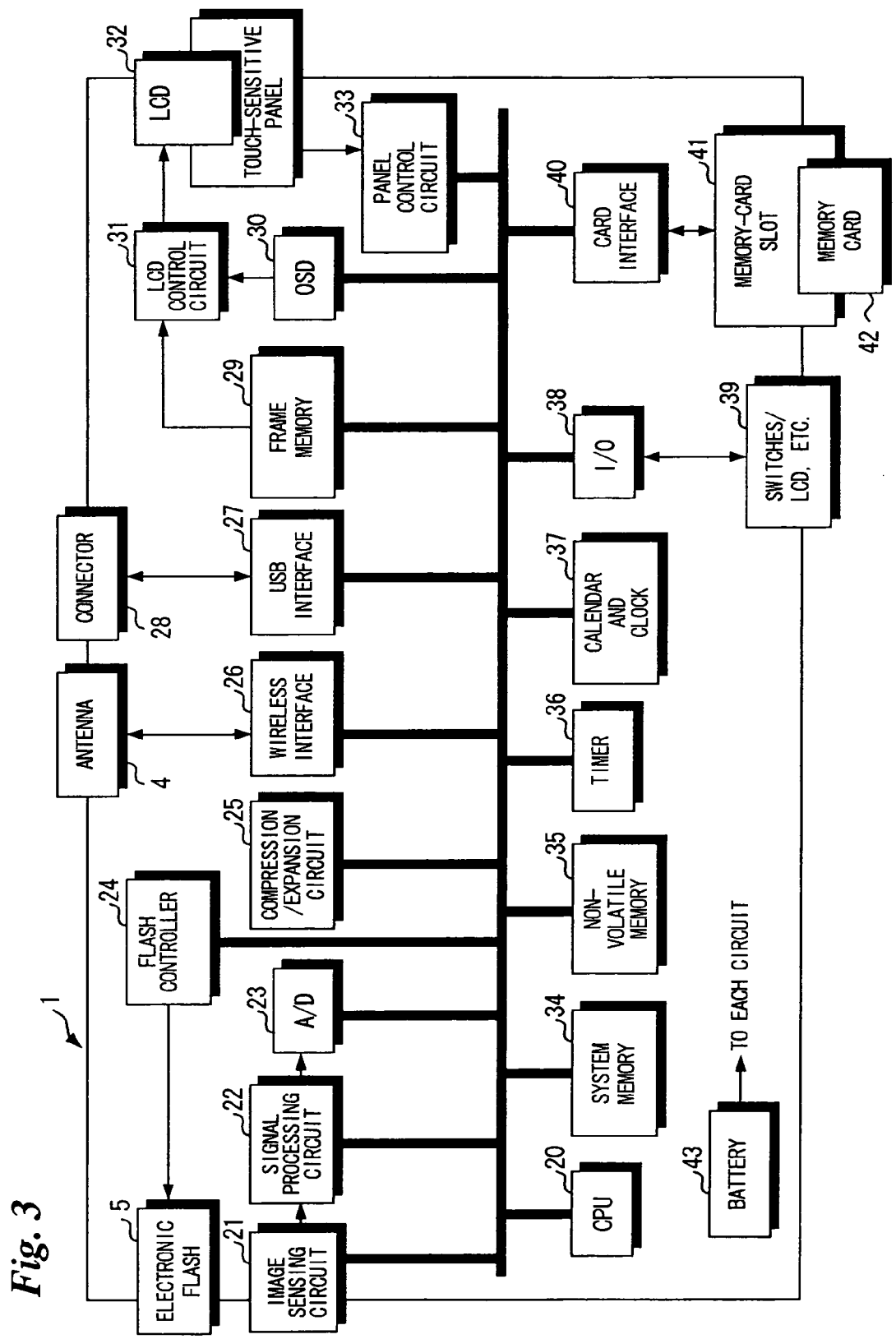
FIG. 3 is a block diagram illustrating the electrical structure of a digital still camera.

FIG. 3 is a block diagram illustrating the electrical structure of the digital still camera 1.

The overall operation of the digital still camera 1 is controlled by a CPU 20. A battery 43 supplies power to the CPU 20 and various other circuits and devices included in the digital still camera 1.

The digital still camera 1 includes a system memory 34 and a non-volatile memory 35. A program and data, etc., for controlling the operation of the digital still camera 1 have been stored in the system memory 34. A browser (described later), image selection program (described later), command set (described later), capability script (described later) and other programs and data have been stored in the non-volatile memory 35. A timer 36 is used to measure elapsed time when photography is performed using a self-timer. Date and time are measured by a calendar and clock 37.

Output signals from the above-described mode selection dial 2, shutter-release button 3, display screen (touch-sensitive panel) 7, up, down, left, right key 8, menu button 9, execute button 10 and cancel button 11 (these are indicated at reference numeral 39 in FIG. 3) are input to the CPU 20 via an input/output (I/O) unit 38. If the digital still camera 1 has been provided with a light-emitting element (LED), a light-emission signal is output to the LED via the input/output unit 38.

The electronic flash device 5 has its light emission controlled by a flash controller 24.

If the camera mode 2e is selected by the mode selection dial 2, the image of the subject is sensed by a CCD included in an image sensing circuit 21. A video signal representing the image of the subject is output from the image sensing circuit 21 to a signal processing circuit 22, which proceeds to execute predetermined signal processing. The video signal that is output from the signal processing circuit 22 is converted to digital image data in an analog/digital converting circuit 23.

The digital image data is input to an LCD control circuit 31 via a frame memory 29 and is converted in the LCD control circuit 31 to data suited to an LCD display. An image is displayed on the display screen 7.

Also input to the LCD control circuit 31 is an on-screen signal from an on-screen device (OSD) 30. Characters standing for date and time represented by the on-screen signal and an image representing a character can be displayed on a liquid crystal display device 32 (display screen 7) in a form superimposed on the captured image.

Thus, the liquid crystal display device 32 (display screen 7) functions also as a touch-sensitive panel. An output signal from the display screen (touch-sensitive panel) 7 is input to the CPU 20 via a panel control circuit 33.

If the shutter-release button 3 is pressed when the camera mode 2e has been selected by the mode selection dial 2, the image data obtained as described above is stored temporarily in the frame memory 29. The image data is read out of the frame memory 29 and is compressed by a compression/expansion circuit 25. The compressed image data is recorded on a memory card 42 that has been inserted in an memory-card slot 41 via a card interface 40.

If the playback mode 2*f* is selected, image data that has been recorded on the memory card 42 is applied to the compression/expansion circuit 25 via the card interface 40. The compression/expansion circuit 25 executes expansion processing and inputs the expanded image data to the LCD control circuit 31 via the frame memory 29. The image represented by the image data that has been recorded on the memory card 42 is displayed on the liquid crystal display device 32 (display screen 7).

The digital still camera 1 is equipped with an antenna 4 for wirelessly communicating with the printer 50 in the manner mentioned above. A wireless interface 26 is connected to the antenna 4. Data is sent and received between the digital still camera 1 and printer 50 via the antenna 4. The digital still camera 1 includes a USB interface 27 and a connector 28 connected thereto. One end of the USB cable 15 is connected to the connector 28 and the other end is connected to the printer 50, whereby the digital still camera 1 and printer 50 are connected by the USB cable 15 so as to be capable of communicating with each other.

Figure 4:
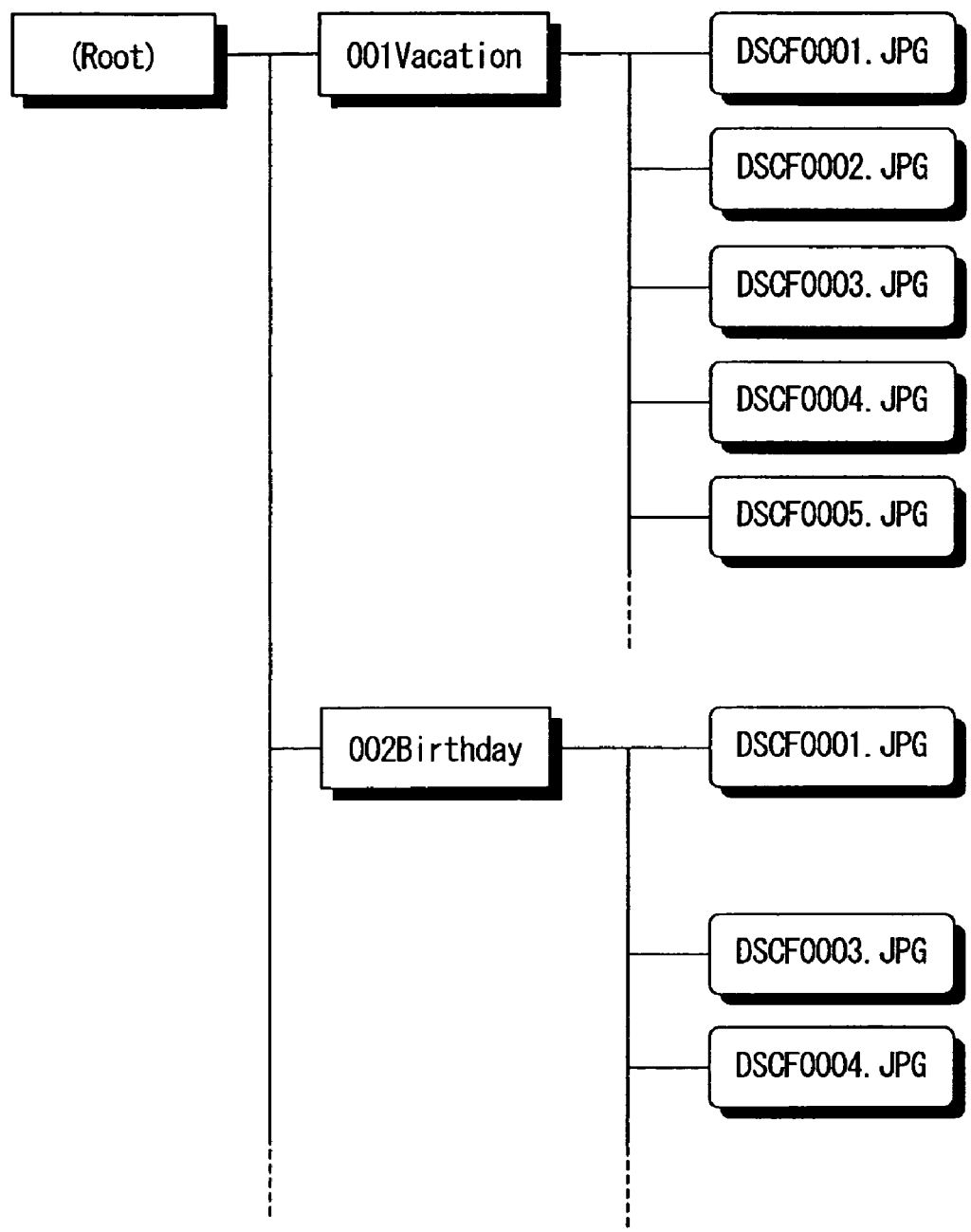
FIG. 4 illustrates the directory structure of image files.

FIG. 4 illustrates the file structure (directory structure) of image files (data) recorded on the memory card 42.

Image files recorded on the memory card 42 are recorded so as to belong to a directory.

In this embodiment, one or a plurality of directories (the directory shall be referred to as an "image directory") are created in a layer subordinate to a root, and one or a plurality of image files are correlated to the image directory. An image directory is assigned a directory name that includes a directory number. For example, "001" is a directory number in a directory name "001 Vacation".

A file name that includes a file number is assigned to an image file correlated with an image directory. For example, "0001" is a file number in a file name "DSCF0001.JPG".

A number that is a combination of a directory number and a file number is adopted as a frame number. For example, the frame number of the image file "DSCF0001.JPG" correlated with image directory "001 Vacation" is "001-0001".

Figure 5:
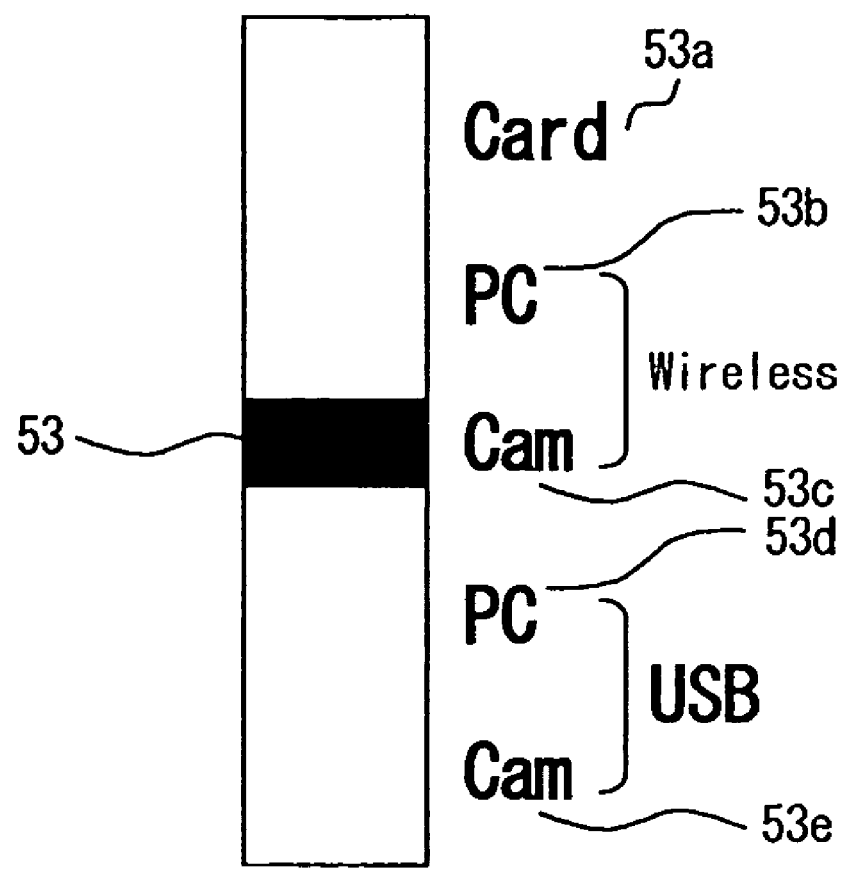
FIG. 5 illustrates a mode selection slide switch.
Figure 6:
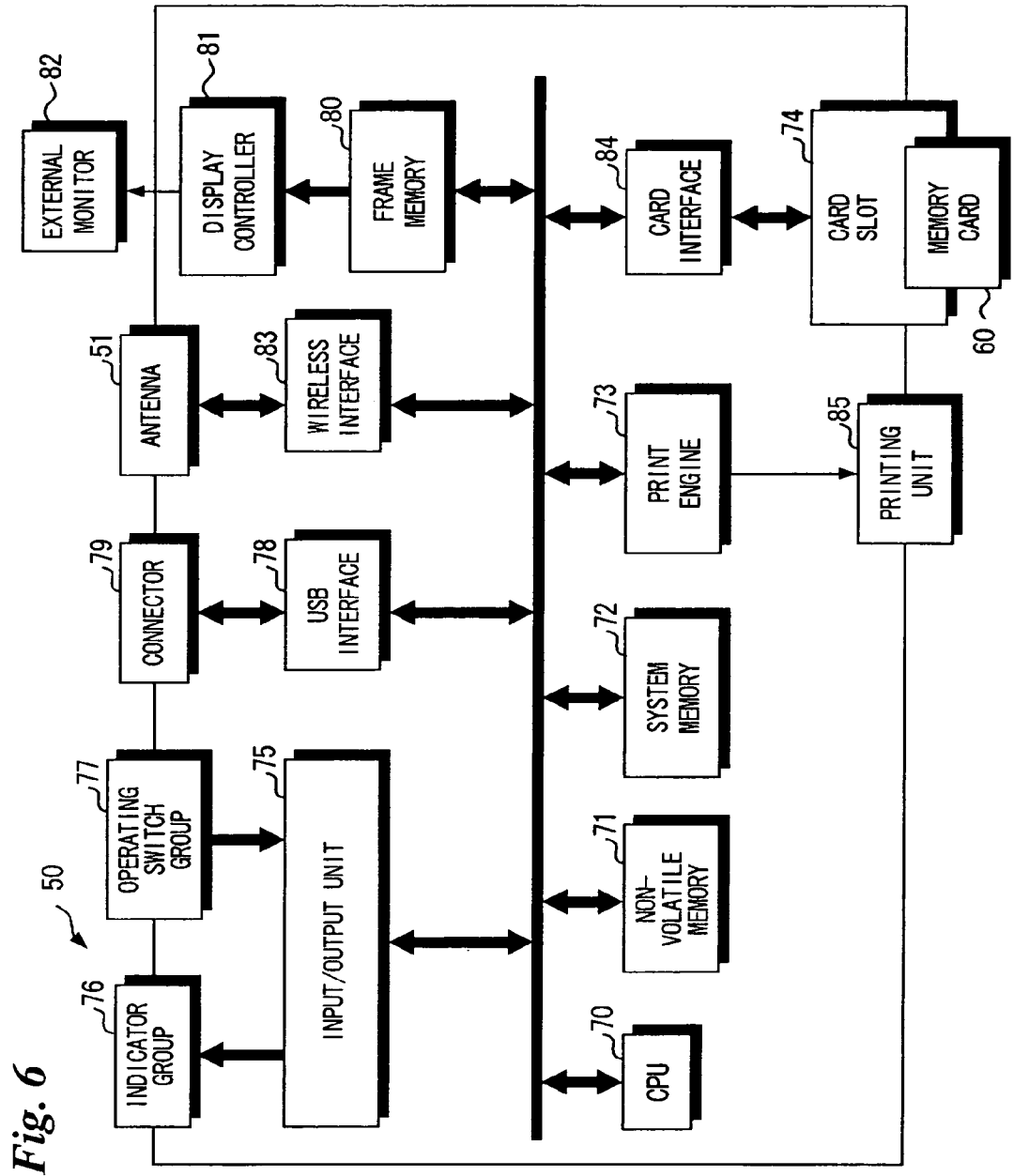
FIG. 6 is a block diagram illustrating the electrical structure of a printer.

The printer 50 will be described with reference to FIGS. 1, 5 and 6, in which FIG. 5 is an enlarged plan view of the mode selection slide switch 53 of printer 50 and FIG. 6 is a block diagram illustrating the electrical structure of the printer 50.

The mode selection slide switch 53 is provided slidably on the printer 50. By sliding the mode selection slide switch 53, any one of a card mode (Card) 53*a*, wireless PC communication mode (Wireless PC) 53*b*, wireless camera communication mode (Wireless Cam) 53*c*, PC communication mode (USB PC) 53*d* and USB camera communication mode (USB Cam) 53*e* is selected. The card mode 53*a* is selected if an image represented by image data that has been recorded on the memory card 60 inserted into the card slot 59 is to be printed. The wireless PC communication mode 53*b* is selected if data is sent and received wirelessly to and from a personal computer (not shown) via the antenna 51 and an image represented by image data transmitted from the personal computer is to be printed. The wireless camera communication mode 53*c* is selected if data is sent and received wirelessly to and from the digital still camera 1 via the antenna 51 and an image represented by image data transmitted from the digital still camera 1 is to be printed. The PC communication mode 53*d* and USB camera communication mode 53*e* are selected if data is sent and received to and from a personal computer or the digital still camera 1 using the USB cable 15 and an image represented by image data transmitted from the personal computer or digital still camera 1 is to be printed.

The printer 50 includes a CPU 70 by which the overall operation of the printer 50 is controlled.

The printer 50 includes a non-volatile memory 71 in which have been stored a command set (described later), HTML data, printer model name, capability script (described later) as well as other programs and data. A program for controlling operation of the printer 50 and data have been stored in a system memory 72.

A print engine 73 is for setting a profile and executing other processing. The print engine 73 is connected to a printing unit 85. If image data that is output from the print engine 73 is applied to the printing unit 85, the latter prints an image (inclusive of characters) on printing paper. Printing paper on which an image has been printed is ejected to the outside of the printer 50 from the ejection port 61.

Output signals from the above-described mode selection slide switch 53 and switch group 54 (these switches shall be referred to collectively as an operating switch group 77) are input to the CPU 70 via an input/output unit 75. Display signals are output via the input/output unit 75 to an indicator group 76 that includes the power lamp 58.

If the card mode 53*a* is selected by the mode selection slide switch 53, an image represented by image data that has been recorded on the memory card 60 inserted into a card slot 74 is printed. Image data that has been read out of the memory card 60 in the card slot 74 is stored temporarily in a frame memory 80 via a card interface 84. Image data that has been read out of the frame memory 80 is input to the print engine 73. The image data is input from the print engine 73 to the printing unit 85, which proceeds to print the image on printing paper.

Image data that has been stored in the frame memory 80 can be applied via a display controller 81 to an external monitor 82 provided on the printer 50 or connected to the printer 50. The image represented by the image data is displayed on the external monitor 82.

The printer 50 is equipped with the antenna 51 for communicating with the digital still camera 1, as mentioned above, and a wireless interface 83 is connected to the antenna 51. Data is sent and received between the printer 50 and digital still camera 1 via the antenna 51. Further, the printer 50 includes a USB interface 78 and a connector 79 connected thereto. One end of the USB cable 15 is connected to the connector 79 and the other end is connected to the digital still camera 1, whereby the digital still camera 1 and printer 50 are connected via the USB cable 15 in a manner capable of communicating with each other.

FIG. 7 illustrates an example of supported print types and supported paper sizes with regard to the digital still camera 1 and printer (product name: NC-100) 50 that construct the direct print system.

As will be described next, the digital still camera 1 and printer 50 that construct the direct print system of this embodiment support two types of prints, namely prints based upon the command-based model and prints based upon the user-interface export model.

The command-based model refers to a system in which command sets are prepared (stored) in advance for both the control apparatus and controlled apparatus and the commands contained in the command sets are utilized to control the controlled apparatus from the control apparatus. Commands stored in the control apparatus are for controlling the controlled apparatus, and commands stored in the controlled apparatus are for interpreting commands transmitted from the control apparatus and executing processing based upon these commands. It goes without saying, therefore, that it is not necessarily required that the commands stored in the control apparatus and the commands stored in the controlled apparatus be identical. The digital still camera 1 and printer 50 constitute a print system of a command-based model. The printer 50 in this system is controlled based upon commands transmitted from the digital still camera 1 to the printer 50 so that the printer 50 can perform printing.

The user-interface export model refers to a system in which the controlled apparatus is operated as a server and the control apparatus is operated as a client. The digital still camera 1 and printer 50 constitute a print system of a command-based architecture, as described above, and also constitute a print system of a user-interface export model. The digital still camera 1 operates as a client and the printer 50 as a server. User interface data is transmitted from the printer (server) 50 to the digital still camera (client) 1 and the user interface data is received by the digital still camera 1. Instruction data is input to the digital still camera 1 based upon the user interface data received. The instruction data that has entered the digital still camera 1 is transmitted to the printer 50. The latter is controlled based upon the instruction data and performs printing. In the user-interface export model, as will be described later, a browser that has been stored in the non-volatile memory 35 of the digital still camera 1 is used to send and receive data to and from the digital still camera 1. The printer 50 is controlled by the instruction data input using the browser.

In general, the command sets provided in the control apparatus and controlled apparatus, which are premised on use in the command-based model, agree or the controlled apparatus is equipped with all of the commands provided in the control apparatus. The controlled apparatus is controlled based upon commands with which the control apparatus is equipped.

The digital still camera 1 constructing the direct print system in the embodiment of FIG. 7 supports the following print types: "STANDARD PRINT", "MULTI-PRINT 2-UP" and "MULTI-PRINT 4-UP". The digital still camera 1 cannot specify a support paper size. That is, the digital still camera 1 is equipped with commands for each of "STANDARD PRINT", "MULTI-PRINT 2-UP" and "MULTI-PRINT 4-UP".

On the other hand, the printer (NC-100) 50 that constructs the direct print system in the embodiment of FIG. 7 supports the following print types: "STANDARD PRINT", "MULTI-PRINT 2-UP", "MULTI-PRINT 4-UP", "MULTI-PRINT 9-UP", "MULTI-PRINT 16-UP" and "INDEX PRINT", and supports the following paper sizes: "L SIZE" and "2L SIZE". That is, the printer (NC-100) 50 is equipped with commands for each of "STANDARD PRINT", "MULTI-PRINT 4-UP", "MULTI-PRINT 9-UP", "MULTI-PRINT 16-UP", "INDEX PRINT", "L SIZE" and "2L SIZE".

Both the digital still camera 1 and printer 50 are equipped with common commands in regard to "STANDARD PRINT" and "MULTI-PRINT 4-UP". This means that printing based upon the command-based model is possible with regard to "STANDARD PRINT" and "MULTI-PRINT 4-UP". Furthermore, the digital still camera 1 and printer 50 in this embodiment are also capable of performing printing based upon the user-interface export model, as mentioned above. This means that the types of printing ("MULTI-PRINT 9-UP", "MULTI-PRINT 16-UP" and "INDEX PRINT") that can be performed by the printer 50 but cannot be implemented with the command-based model are capable of being performed with the user-interface export model.

Reference will now be had to FIGS. 8 to 20 to describe the operation of the direct print system comprising the digital still camera 1 and printer 50, particular the operation of the system with focus on printing based upon the command-based model and printing based upon the user-interface export model.

FIGS. 8 to 11 are flowcharts illustrating the flow of operation of the direct print system. The flow of operation of the digital still camera 1 and the flow of operation of the printer 50 are illustrated on the left and right sides, respectively, of the flowcharts.

Figure 12:
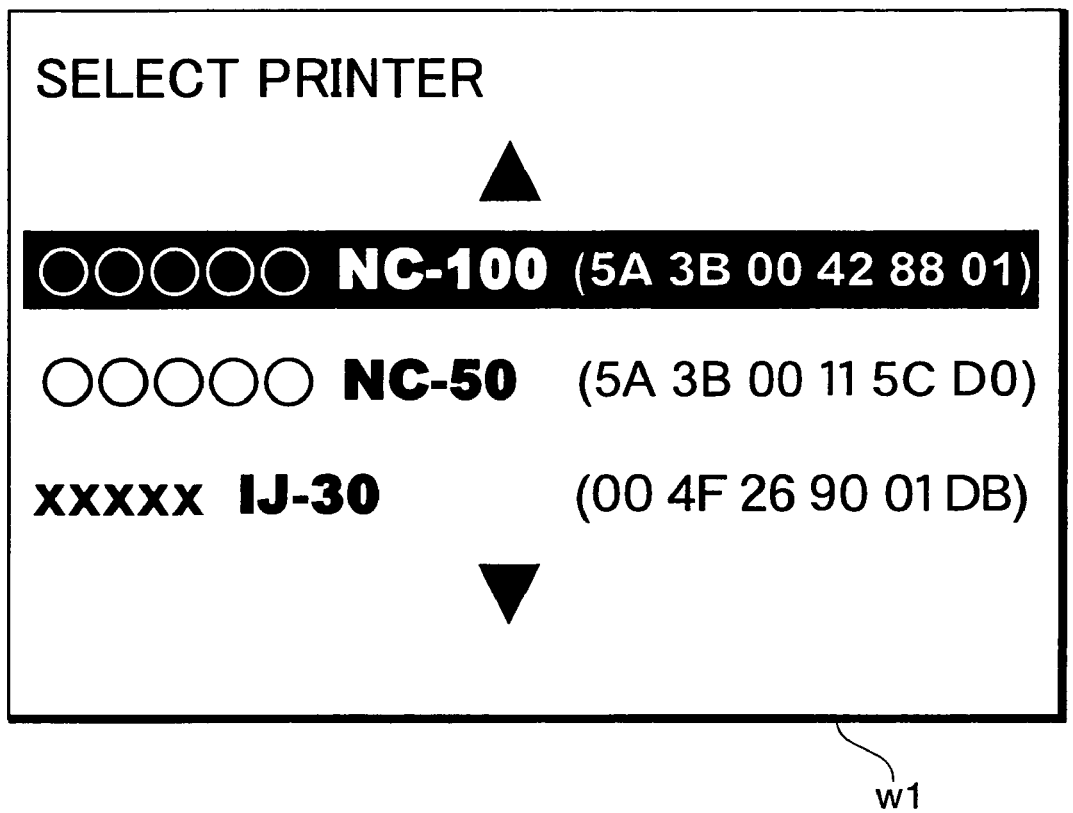
FIG. 12 illustrates an example of a printer-model selection screen.

If the mode selection dial 2 of the digital still camera 1 is set to the print mode 2b, then the model names of the printers connectable to the digital still camera 1 are displayed on the display screen 7 of digital still camera 1 (step 91) (FIG. 12; printer-model selection screen W1). Printers connectable to the digital still camera 1 are those located within a range of distances in which the printer is capable of wirelessly communicating with the digital still camera 1 and, moreover, for which the mode selection slide switch 53 (see FIG. 5) has been set to the wireless camera communication mode (Cam Wireless) 53c, or those connected to the digital still camera 1 by the USB cable 15 and, moreover, for which the mode selection slide switch 53 has been set to the USB camera communication mode (Cam USB) 53e.

The model name of the printer has already been stored in the non-volatile memory 71 of the printer 50. The printer-model selection screen W1 is formed in response to the print model name, which has been stored in the non-volatile memory 71 of printer 50, being transmitted to the digital still camera 1. If a plurality of printers 50 are connectable to the digital still camera 1, then a plurality of printer model names (00000 NC-100, 00000 NC-50 and XXXXX IJ-30) are displayed as a list on the printer-model selection screen W1, as illustrated in FIG. 12. The character strings within the parentheses that follow the printer model names are MAC addresses of the respective printers. The MAC addresses, however, need not necessarily be displayed.

The printer 50 to be used in printing is selected by the user (step 92). The selection of the printer 50 is made by touching the up triangle or the down triangle on the printer-model selection screen W1 or by pressing the up or down part of the up, down, left, right key 8. The model name of the selected printer is highlighted. If the execute button 10 is pressed, then the printer whose model name has been highlighted is decided upon as the printer 50 to be used in printing.

When the printer 50 to be used in printing is selected, connection request data is transmitted from the digital still camera 1 to the selected printer 50. Upon receiving the connection request data from the digital still camera 1, the printer 50 sends reception complete data back to the digital still camera 1. A connection between the digital still camera 1 and printer 50 is thus set up.

Upon receiving the connection complete data, the digital still camera 1 requests the printer 50 for its capabilities. Upon accepting the request for capabilities, the printer 50 reads out the capability script that has been stored in the non-volatile memory 71 and transmits the script to the digital still camera 1.

FIG. 13 illustrates an example of description of capability script stored in the non-volatile memory 71 of printer 50 and transmitted from the printer 50 to the digital still camera 1. The portion written in alphabetic characters on the left side of the capability script shown in FIG. 13 is a description of the capability script. The text on the right side is an explanation of the description of the capability script; it does not constitute capability script.

The capability script includes descriptions relating to name of the printer manufacturer, the printer model name, the types of printing supported by the printer (the commands possessed by the printer), and the types of printing paper supported by the printer (the commands possessed by the printer). The capability script illustrated in FIG. 13 describes that the printer supports "STANDARD PRINT" (standard-print), "MULTI-PRINT 4-UP" (multi-print N-up="4"), "MULTI-PRINT 9-UP" (multi-print N-up="9"), "MULTI-PRINT 16-UP" (multi-print N-up="16") and "INDEX PRINT" (index-print). The capability script also describes that the printer supports printing on printing paper of "L SIZE" (L) and "2L SIZE" (2L). Commands with regard to the types of printing and types of printing paper supported by the printer 50 and described in the capability script are stored in the non-volatile memory 71.

Upon receiving the capability script from the printer 50, the digital still camera 1 compares the capability script (not shown) of the digital still camera 1 stored in the non-volatile memory 35 of the digital still camera 1 with the received capability script of the printer 50 (step 93).

The types of printing and types of printing paper supported by the printer 50 (the commands possessed thereby) have been written in the capability script of the printer 50, and the types of printing supported by the digital still camera 1 have been written in the capability script of the digital still camera 1, as mentioned above. By comparing the capability scripts, the types of printing capable of being implemented by the command-based model and the types of printing that cannot be implemented by the command-based model are grasped (detected) in the digital still camera 1 and printer 50.

Figure 14:
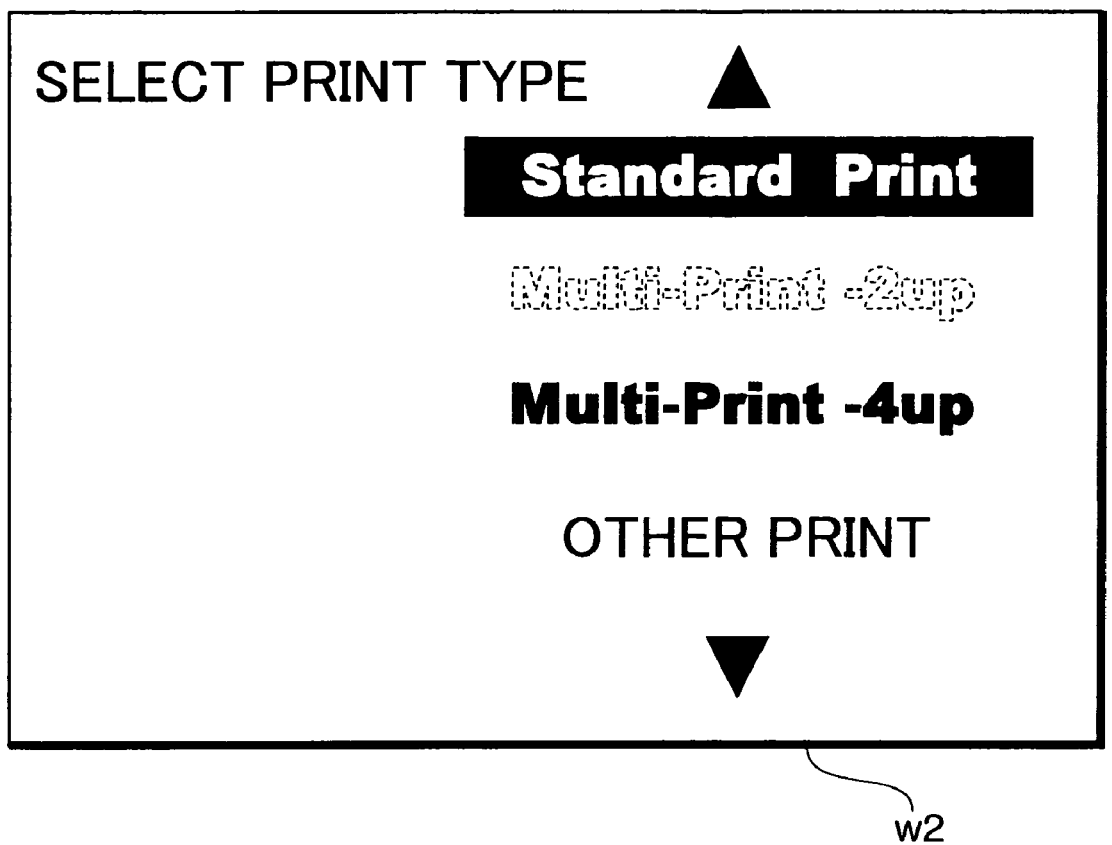
FIG. 14 illustrates an example of a print-type selection screen.

A print-type selection screen W2 is displayed on the display screen 7 of the digital still camera 1 (step 94; FIG. 14). Characters indicating names of print types ("STANDARD PRINT", "MULTI-PRINT 2-UP" and "MULTI-PRINT 4-UP") and "OTHER PRINTS" supported by the digital still camera 1 (i.e., whose commands are possessed by the digital still camera) are displayed on the print-type selection screen W2 shown in FIG. 14. The characters are displayed in normal fashion for those names of print types supported by the digital still camera 1 that are also supported by the printer 50 [namely "STANDARD PRINT" (Standard Print) and "MULTI-PRINT 4-UP" (Multi-Print 4-up)]. The characters are displayed in dimmed fashion (a gray characters) (indicated by the characters with the dotted outlines in FIG. 14) for those names of print types supported by the digital still camera 1 that are not also supported by the printer 50 [namely "MULTI-PRINT 2-UP" (Multi-Print 2-up)]. By virtue of the characters displayed on the print-type selection screen W2, it can be determined which print types among the print types supported by the digital still camera 1 are also supported by the printer 50 (i.e., which print types are capable of being printed by the command-based model) and which print types are not supported by the printer 50.

Described first will be a case where a print type, which here is "STANDARD PRINT", supported by both the digital still camera 1 and printer 50 (i.e., whose commands are possessed by both the camera and printer) has been selected.

If the print type "STANDARD PRINT" has been selected in the digital still camera 1 (step 95), i.e., if the selected print type is supported by both the digital still camera 1 and printer 50 and is capable of being printed by the command-based model ("SUPPORTED" at step 96), then a command representing the selected print type is transmitted from the digital still camera 1 to the printer 50. If the command relating to print type is received from the digital still camera 1, the printer 50 sends back to the digital still camera 1 the fact that the command has been received normally.

Figure 15:
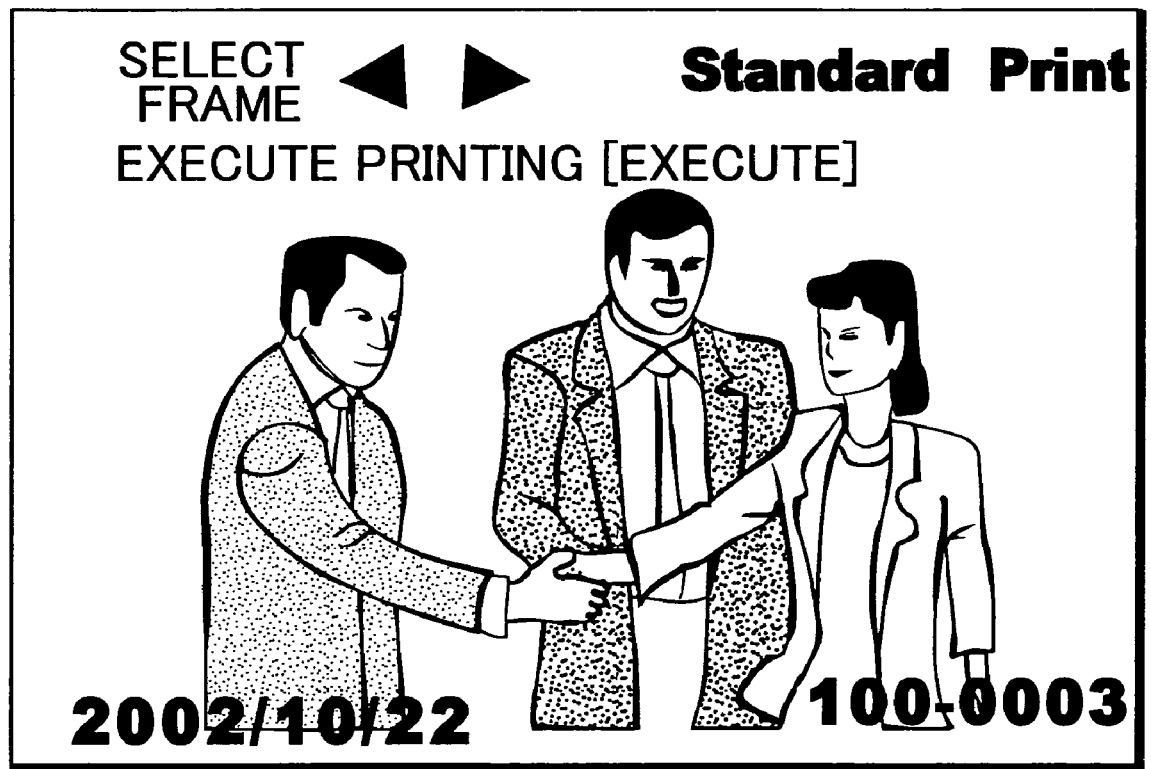
FIG. 15 illustrates an example of a print-image selection screen.

Upon receiving from the printer 50 notification of the fact that the print-type related command has been received normally, the digital still camera 1 executes the image selection program that has been stored in the non-volatile memory 35. A screen for selecting an image to be printed (print-image selection screen W3) is displayed on the display screen 7 of the digital still camera 1 (step 97; FIG. 15). An image based upon image data that has been recorded on the memory card 42 inserted into the digital still camera 1 is displayed on the print-image selection screen W3, and frame selection arrows, name of print type, print execution button, date of photography and frame number are displayed in a form superimposed on the image. If a frame selection arrow is touched, the image of the next frame (or the image of the preceding frame) is displayed on the print-image selection screen W3.

If the print execution button is touched, the image being displayed on the print-image selection screen W3 is decided upon as the image to be printed. Image data representing the image decided is transmitted to the printer 50 via, e.g., the wireless interface 26 and antenna 4 of the digital still camera 1.

The image data that has been transmitted to the printer 50 is received by the antenna 51 of the printer 50 and stored in the frame memory 80 through the wireless interface 83. The printer 50 sends back to the digital still camera 1 an indication that the image data has been received normally. The image data that has been stored in the frame memory 80 is read out and applied to the print engine 73. The printing unit 85 connected to the print engine 73 prints the image based upon the image data on printing paper and ejects the paper (step 99).

In the example described above, commands regarding types of printing paper have not been stored in the non-volatile memory 35 of the digital still camera 1 and therefore the image is printed on printing paper (paper of size L or 2L) that is based upon the standard setting of the printer 50.

If other images are to be printed, the above-described processing is repeated ("NO" at step 98).

If the mode selection dial 2 of the digital still camera 1 is switched from the print mode 2b to another mode, a disconnect request is transmitted from the digital still camera 1 to the printer 50. Upon receiving the disconnect request, the printer 50 sends disconnect completion data back to the digital still camera 1 and terminates the connection.

Described next will be a case where a print type not supported by the digital still camera 1 has been selected.

For example, a case where "OTHER PRINT" has been selected on the print-type selection screen W2 (FIG. 14) will be described. In this case, printing based upon the user-interface export model is performed instead of printing based upon the command-based model.

Figure 8:
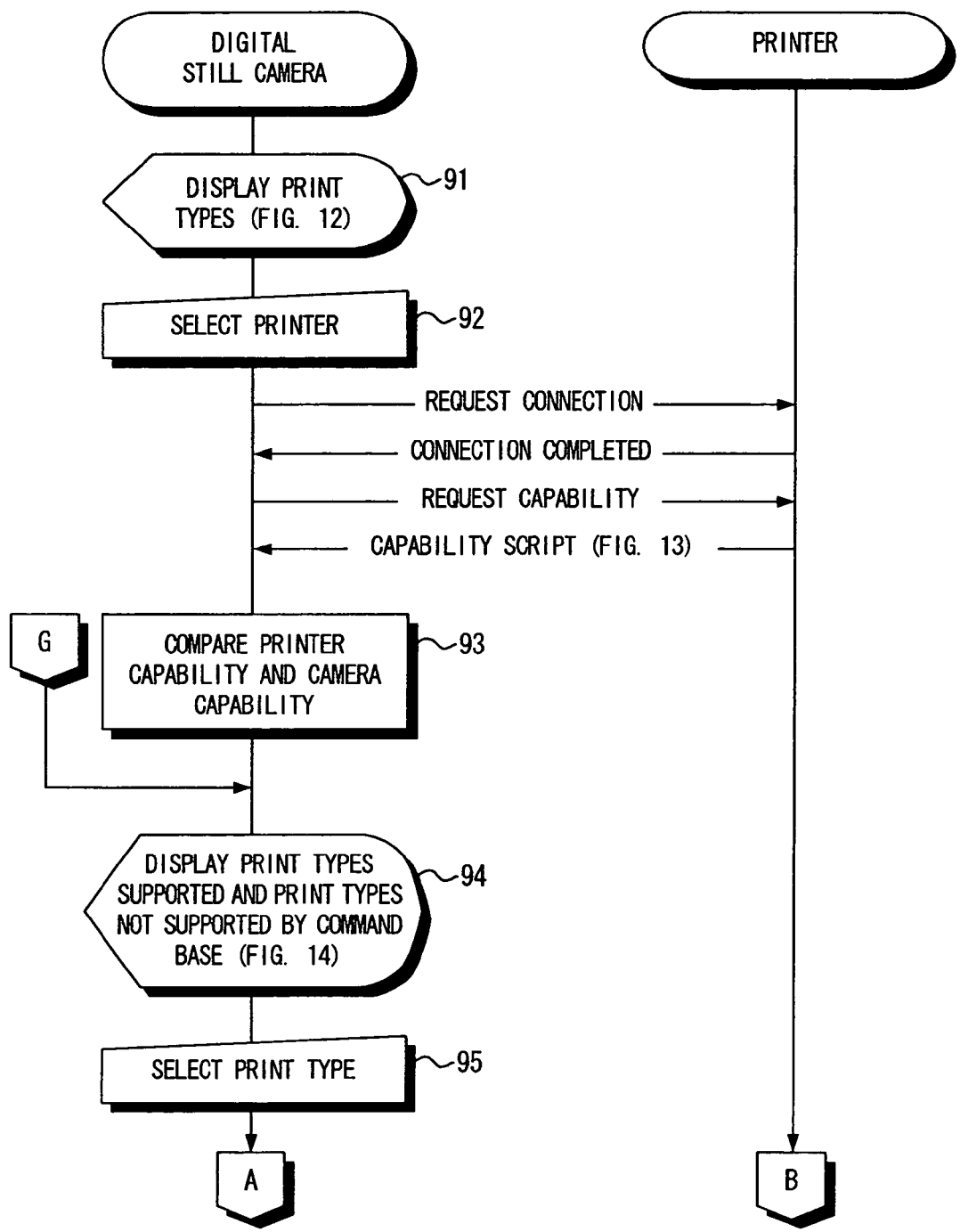
FIGS. 8 to 11 are flowcharts illustrating processing executed by a digital still camera and by a printer.
Figure 9:
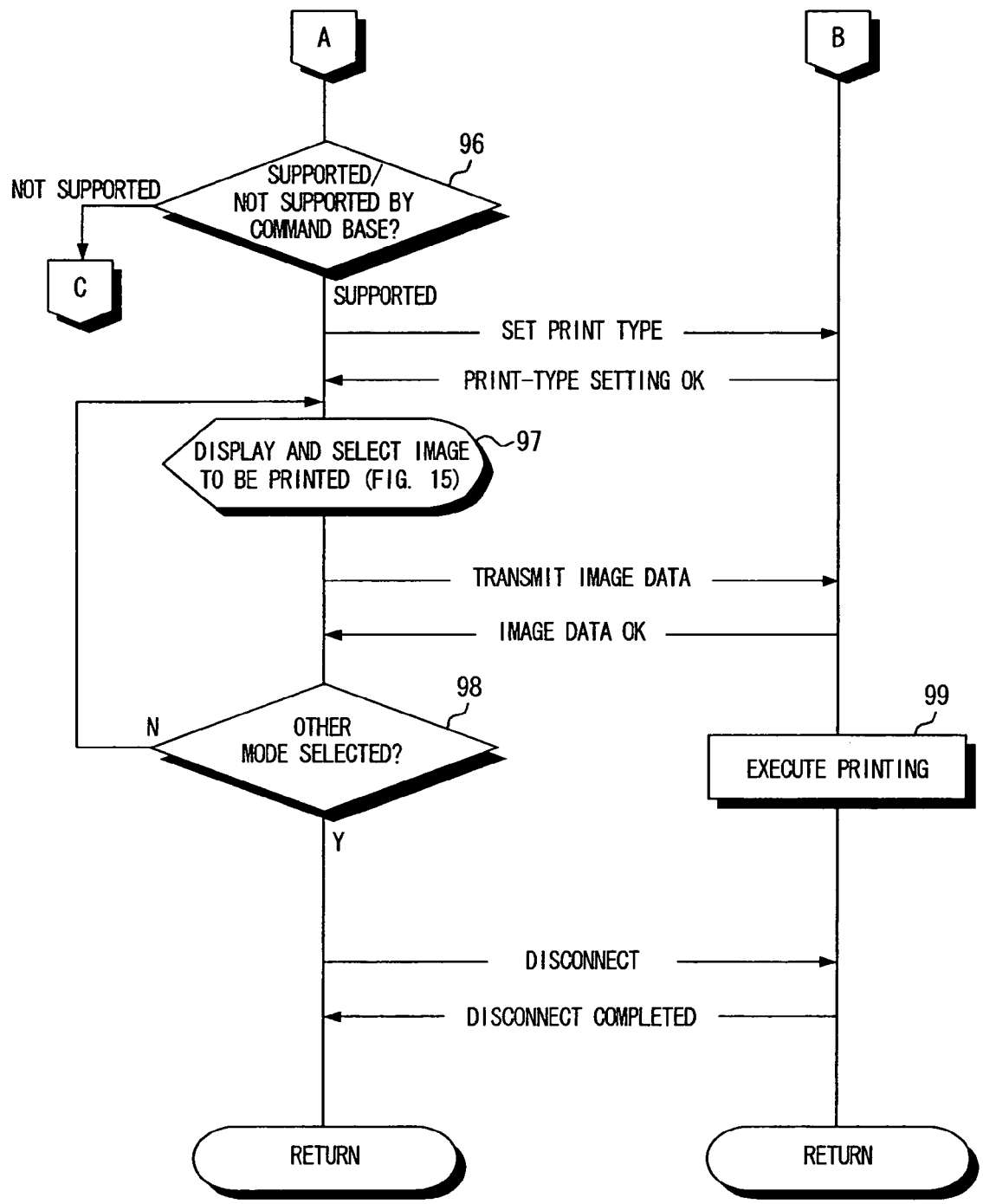
Figure 10:
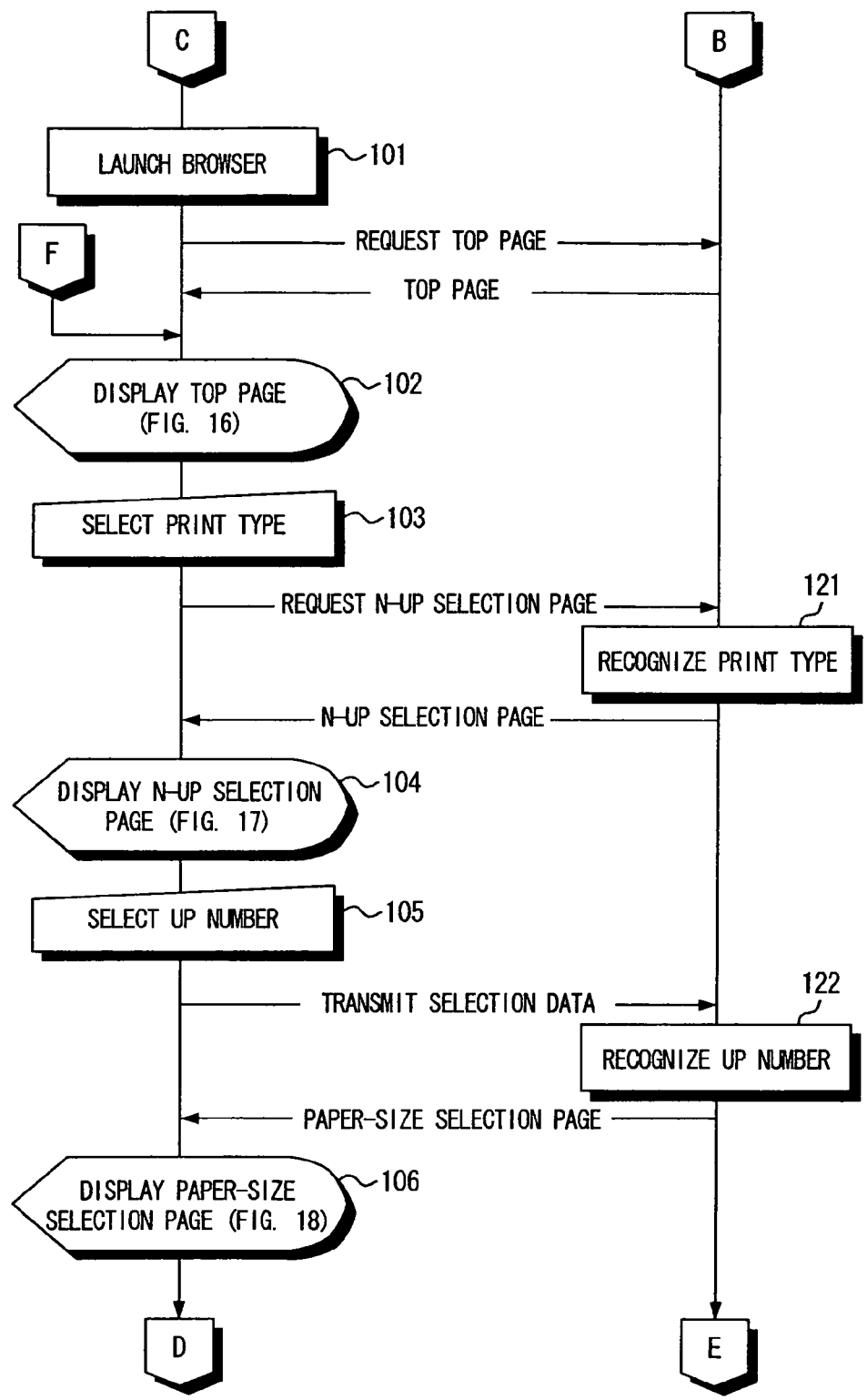
Figure 11:
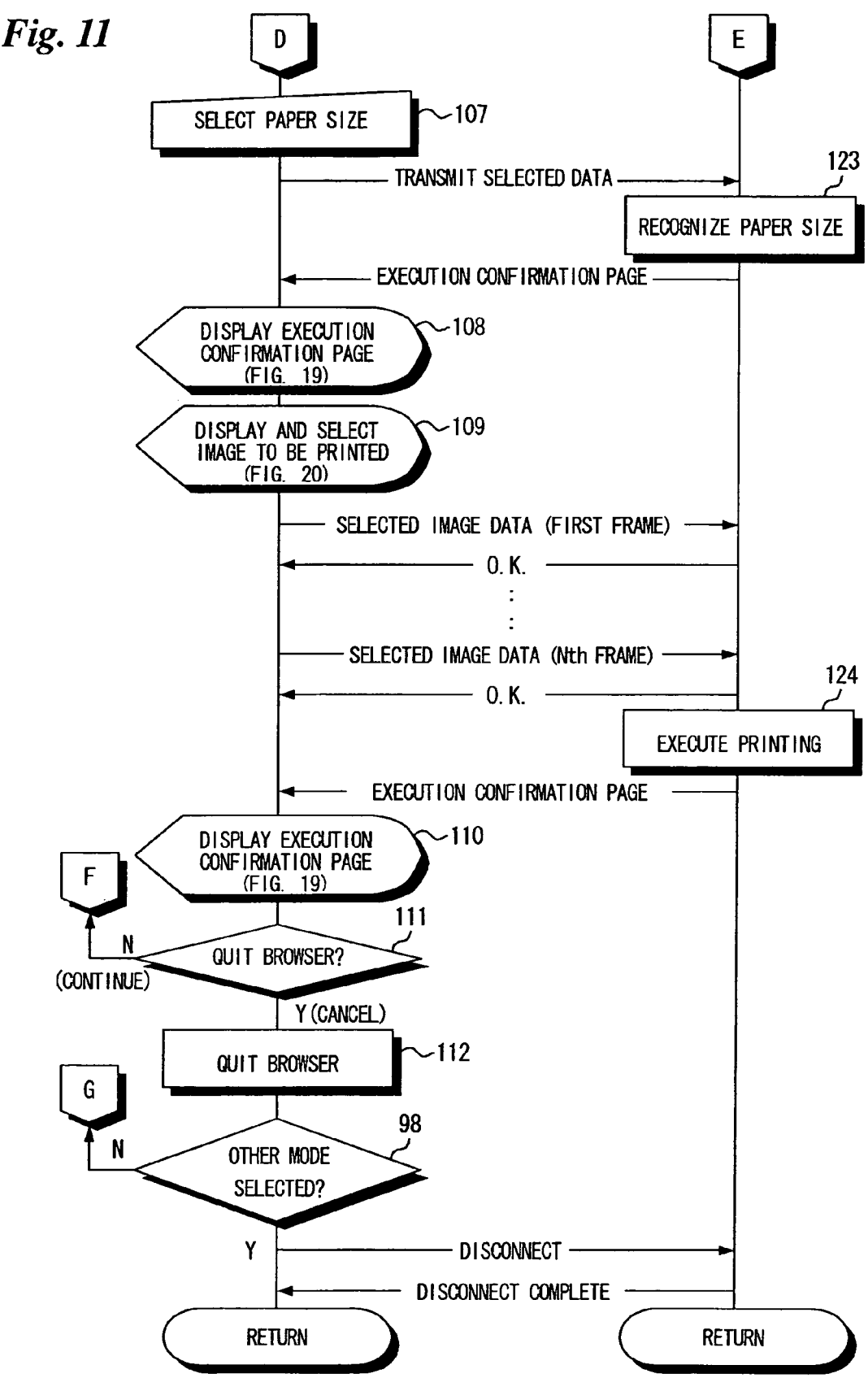

If "OTHER PRINT" is selected (step 95 in FIG. 8; "NOT SUPPORTED" at step 96 in FIG. 9), then the digital still camera 1 launches the browser that has been stored in the non-volatile memory 35 (step 101 in FIG. 10).

The digital still camera 1 transmits a top-page request to the printer 50. Upon receiving the top-page request, the printer 50 recognizes that printing based upon the user-interface export model will be carried out. The printer 50 reads data (e.g., HTML data) representing a top page out of the non-volatile memory 71 and transmits this data to the digital still camera 1.

Figure 16:
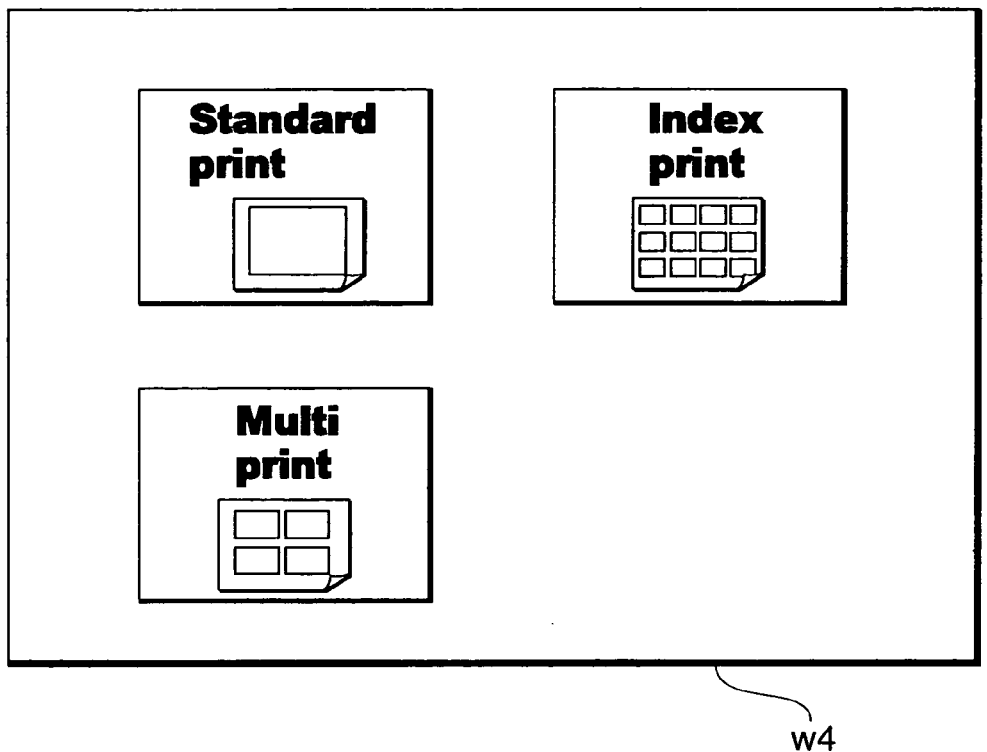
FIG. 16 illustrates an example of a top page.

An image (top page W4) based upon the data-representing the top page transmitted from the printer 50 is displayed on the display screen 7 of the digital still camera 1 (step 102; FIG. 16).

The top page W4 contains selectable images representing three types of printing supported by the printer 50, namely "STANDARD PRINT" (Standard print), "MULTI-PRINT" (Multi-print) and "INDEX PRINT" (Index print).

A case where "MULTI-PRINT" has been selected from among "STANDARD PRINT", "MULTI-PRINT" and "INDEX PRINT" will now be described.

Figure 17:
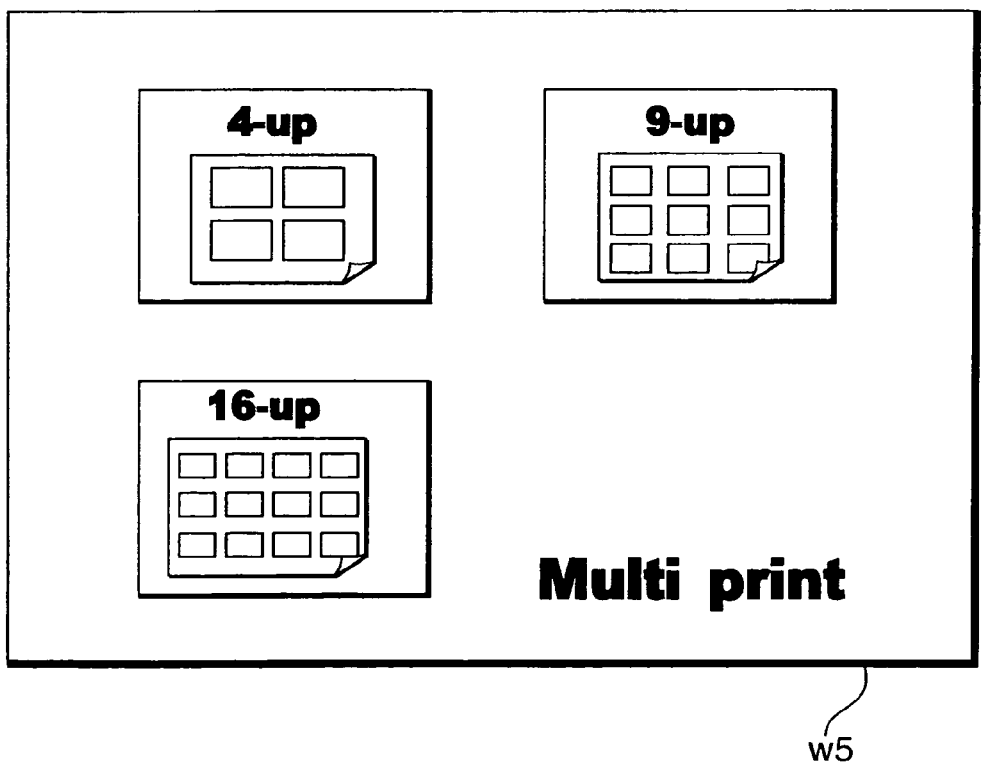
FIG. 17 illustrates an example of an N-up selection page.

When multi-print is selected (step 103), an acquisition request for a page (assumed here to be an N-up selection page (a print-number selection page)) linked to the multi-print image is transmitted from the digital still camera 1 to the printer 50. The latter recognizes the print type (step 121) and transmits data representing the N-up selection page to the digital still camera 1. The N-up selection page is displayed on the display screen 7 of the digital still camera 1 (step 104). FIG. 17 illustrates an example of an image (the N-up selection page W5) displayed instead of the top page W4 on the display screen 7. The N-up selection page W5 includes images for selecting whether four (4-up) images, nine (9-up) image or 16 (16-up) images are to be printed on a single sheet of printing paper. It goes without saying that the print types display on the N-up selection page W5 are print types capable of being printed by the printer 50.

Figure 18:
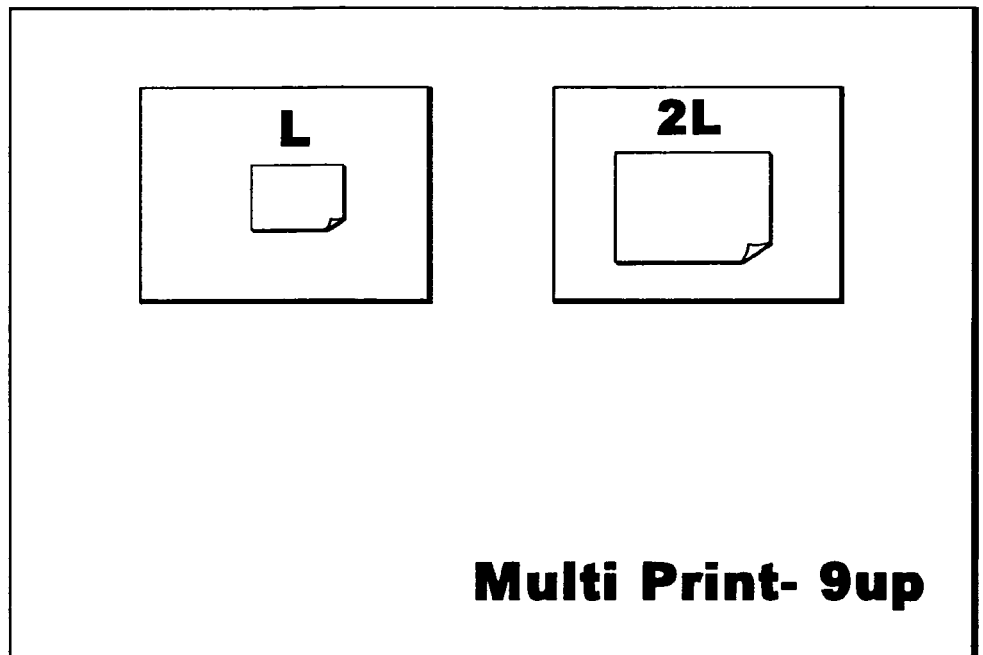
FIG. 18 illustrates an example of a paper-size selection page.

A case where nine (9-up) images have been selected will be described. When nine (9-up) is selected ("SELECT UP NUMBER"; step 105), an acquisition request for a page linked to the 9-up images is transmitted from the digital still camera 1 to the printer 50. The printer 50 recognizes that 9-up has been selected (step 122) and transmits data representing a paper-size selection page to the digital still camera 1. FIG. 18 illustrates an example of an image (a paper-size selection page W6) displayed instead of the N-up selection page W5 (step 106) on the display screen 7 in a case where nine images (9-up) have been selected on the print-number selection page W5.

The paper-size selection page W6 is displayed in such a manner that either of two paper sizes can be selected, namely size L or size 2L. If either paper size is selected (step 107 in FIG. 11), data representing the selected paper size is transmitted from the digital still camera 1 to the printer 50. The latter recognizes the paper size (L or 2L) to be used in printing (step 123).

Figure 19:
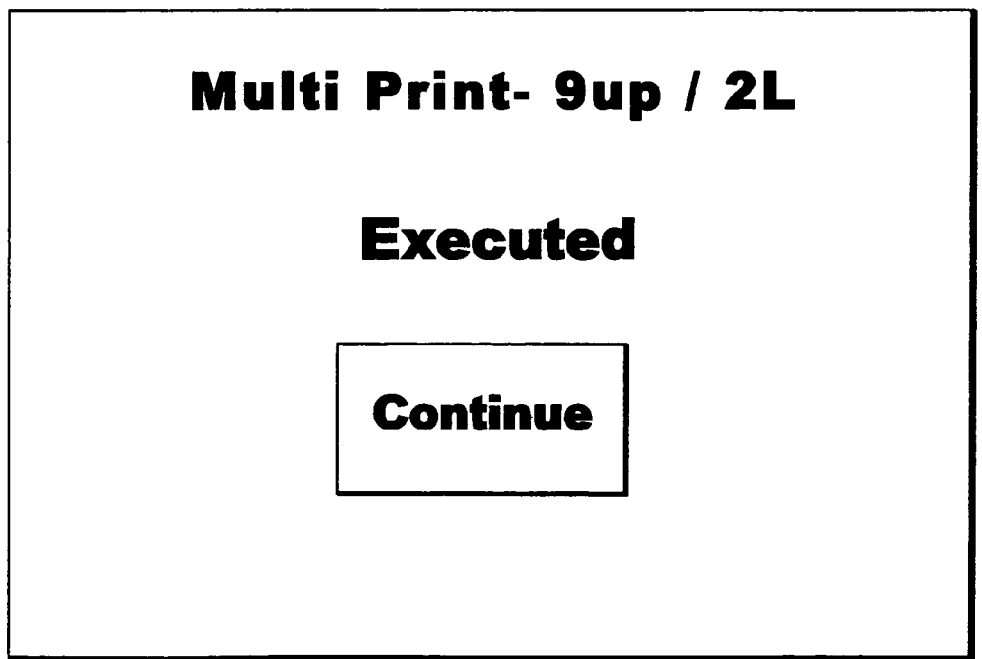
FIG. 19 illustrates an example of execution confirmation page.

An execution confirmation page W7 is transmitted from the printer 50 to the digital still camera 1 and is displayed on the display screen 7 (step 108; FIG. 19).

The execution confirmation page W7 includes a continue button (Continue). If the continue button is clicked, the image selection program that has been stored in the non-volatile memory 35 of digital still camera 1 is read out and executed.

Figure 20:
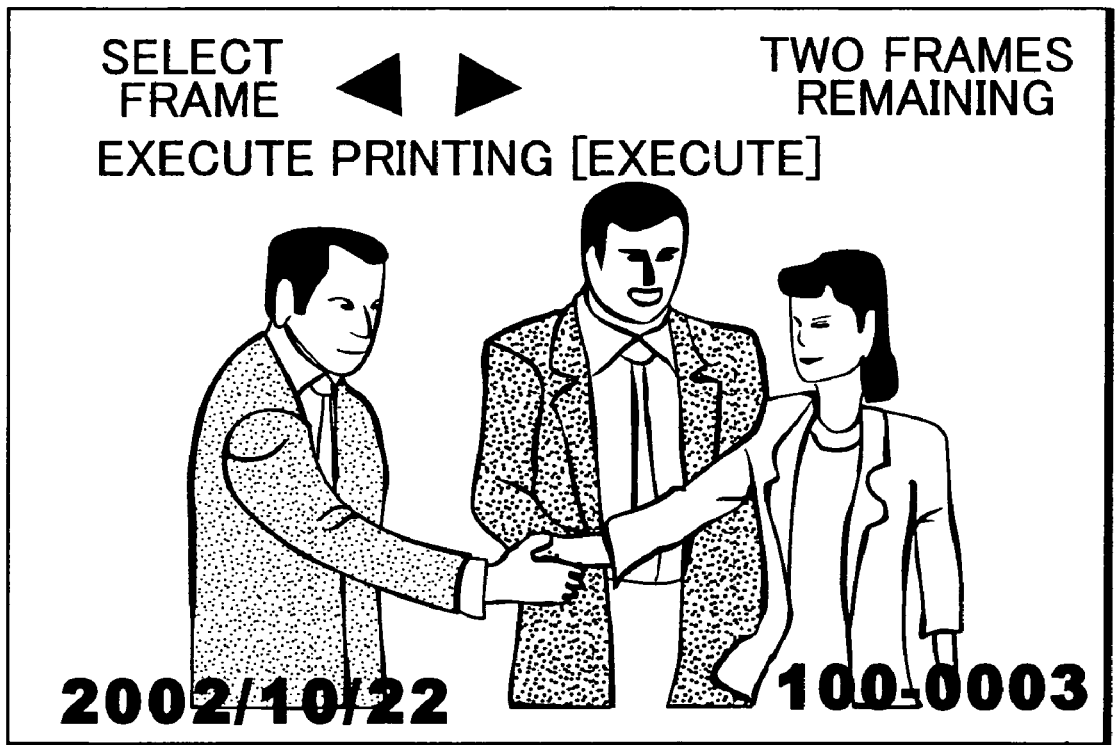
FIG. 20 illustrates an example of a print-image selection screen.

The image represented by the image data that has been recorded on the memory card 42 is displayed on the display screen 7 of the digital still camera 1 (step 109; print-image selection screen W8 in FIG. 20). This screen differs from the print-image selection screen W3 shown in FIG. 15 in that the number of remaining frames is indicated at the upper-right corner of the screen. If 9-up has been selected, for example, image data for nine images will be transmitted from the digital still camera 1 to the printer 50. The number of remaining frames indicates how frames remain to be transmitted to reach the nine images of image data.

If the execute button is clicked, the image data representing the image being displayed on the print-image selection screen W8 is transmitted from the digital still camera 1 to the printer 50. The number of remaining frames is decremented as a result.

When transmission of image data for nine images is completed, the images based upon the image data that has been transmitted from the digital still camera 1 are printed out on the printing paper (step 124).

The execution confirmation page W7 is displayed again on the display screen 7 of the digital still camera 1 (step 110; FIG. 19). If the continue button is touched ("NO" at step 112), the top page W4 is displayed again on the display screen 7 (step 102). If the cancel button 11 is pressed ("YES" at step 111), then the browser is quit (step 112) at the digital still camera 1 and the print-type selection screen W2 (FIG. 14) is displayed again on the display screen 7 ("NO" at step 98; step 94). If the mode selection dial 2 is changed from the print mode 2*b* to another mode ("YES" at step 98), then a disconnect request is transmitted from the digital still camera 1 to the printer 50. Upon receiving the disconnect request, the printer 50 sends disconnect completion data back to the digital still camera 1 and terminates the connection. Of course, by pressing the cancel button 11, the digital still camera 1 and printer 50 may be disconnected and the printer-model selection screen W1 shown in FIG. 12 may be displayed on the display screen 7.

The above-described direct print system supports both the command-based model and the user-interface export model. Printing based upon the command-based model is executed with regard to a type of printing that can be performed by the command-based model, and printing based upon the user-interface export model can be executed with regard to a type of printing that cannot be performed with the command-based model.

Since the command-based model is such that the number of times data is sent and received between the control apparatus (digital still camera 1) and the controlled apparatus (printer 50) (the number of transactions) is small, the control apparatus is capable of controlling the controlled apparatus efficiently.

With the user-interface export model, on the other hand, the number of times data is sent and received (the number of transactions) is large in comparison with the command-based model and it is necessary that the control apparatus execute programs such as the browser. As a consequence, the user-interface export model involves a system that is more complicated than that of the command-based model. However, since control of the controlled apparatus is not limited by the commands, the functions of the controlled apparatus can be exploited fully.

The above-described direct print system has the advantages of both the command-based model and the user-interface export model.

In the first embodiment, a direct print system comprising the digital still camera 1 and the printer 50 is taken as an example and a changeover between (selection of) the command-based model and user-interface export model is described. However, it goes without saying that the changeover between (selection of) the command-based model and user-interface export model is not limited to the relationship between the digital still camera 1 and printer 50. The present invention is applicable to a relationship between a mobile telephone and a household appliance (refrigerator, washing machine, air conditioner, etc.), between a digital still camera and a storage device that stores image data, and between a digital still camera and a display device (television, etc.).

(2) Second Embodiment

In simple terms, a print system described in a second embodiment of the present invention is for printing an image, which is based upon an image file obtained by taking a picture of a subject using a digital camera, on printing paper by a printer. The printer that constructs the print system of the second embodiment is one capable of being used in a so-called direct print system and executes print processing that is in accordance with a prescribed print command for print processing.

A printer used in the direct print system generally provides a plurality of print functions in accordance with print commands. The print functions include, e.g., a function of printing on a plurality of sheets, a print-size selection function (postcard, L size, 2L size, A4, A5, B4, B5, etc.), a printing-paper selection function (special-purpose paper, plain paper, seals, etc.), a split printing function (no split, two-part split, four-part split, etc.), a printing-mode selection function (high-resolution printing mode, high-speed printing mode), an image-quality adjustment function (image-quality adjustment, no image-quality adjustment), and special printing function (none, monochrome, sepia, etc.). There are printers equipped with all of these print functions and printers equipped with only some of these functions. In any case, since a printer executes print processing in accordance with print commands, the printer is equipped with printer commands that correspond to the print functions the printer is capable of providing (or the printer possesses an interpreter that interprets print commands).

Figure 21:
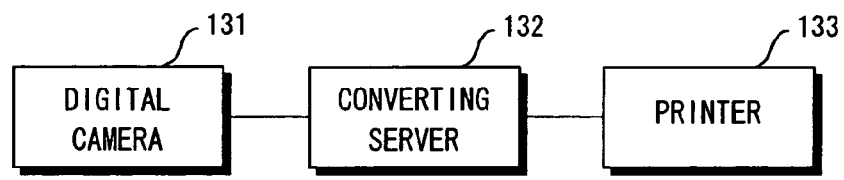
FIG. 21 is a block diagram illustrating an example of the overall configuration of a print system.
Figure 22:
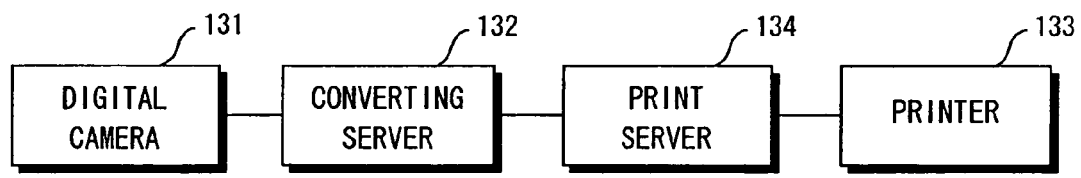
FIG. 22 is a block diagram illustrating another example of the overall configuration of a print system.
Figure 23:
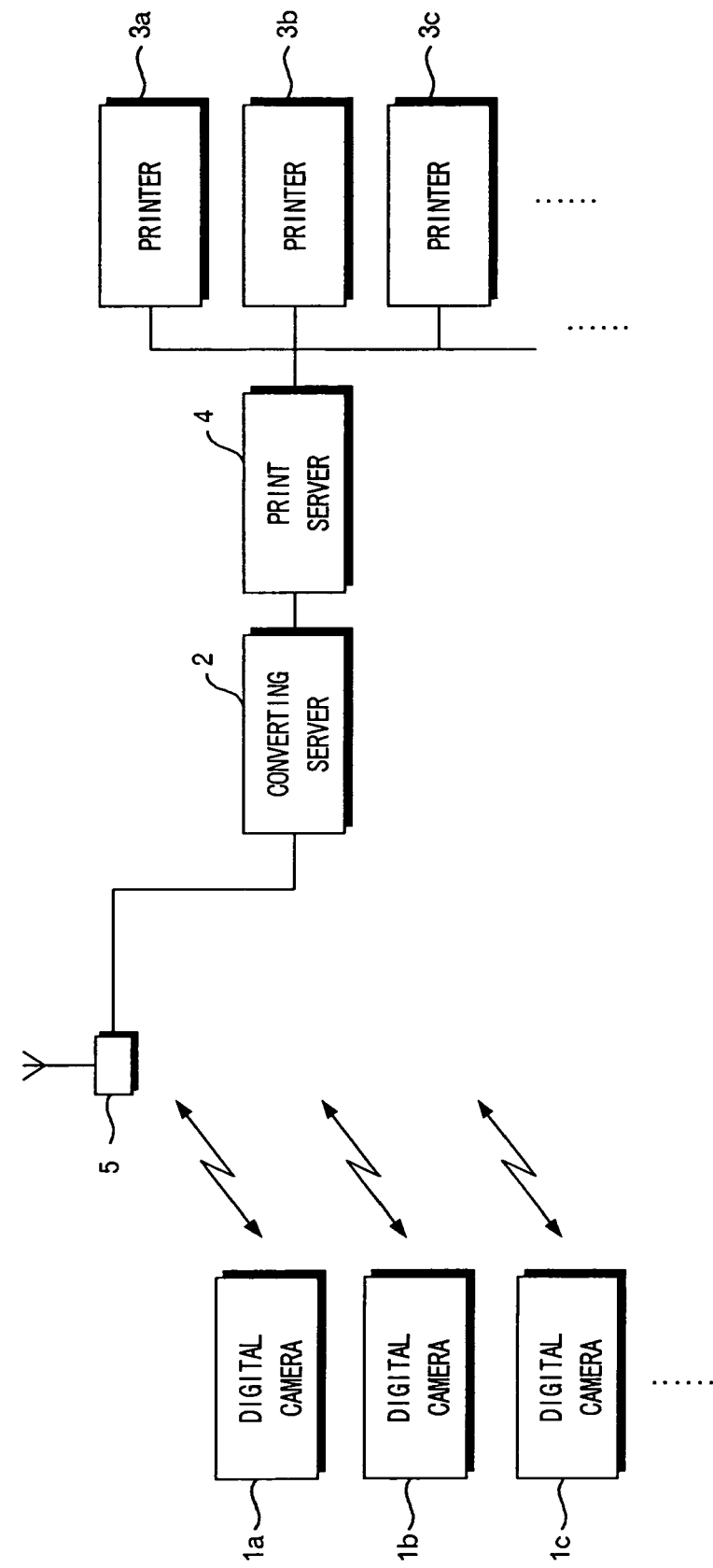
FIG. 23 is a block diagram illustrating yet another example of the overall configuration of a print system.

FIGS. 21, 22 and 23 are block diagrams each of which illustrates a configuration of a print system.

The print system shown in FIG. 21 comprises a digital camera 131, a converting server 132 and a printer 133.

The print system shown in FIG. 22 comprises the digital camera 131, converting server 132, a print server 134 and the printer 133. The print server 134 is equipped with the driver of the printer 133, the address of the printer 133 and other data, and controls data applied to the printer 133.

The print system shown in FIG. 23 comprises a plurality of digital cameras 131a, 131b, 131c, . . . , a wireless communication unit 135, the converting server 132, the print server 134 and a plurality of printers 133a, 133b, 133c, . . . . The wireless communication unit 135 is for sending and receiving data between the plurality of digital cameras 131a, 131b, 131c and the converting server 132.

In all of the print systems configured as shown in FIGS. 21 to 23, an image file in which image data to be printed has been recorded and print specifying information indicating one or a plurality of functions (print types) to be implemented by the printer are transmitted (sent) from the digital camera 131 (131a, 131b, 131c, . . . ) to the printer 133 (133a, 133b, 133c, . . . ), as will be described later. The print specifying information corresponds to print functions (print commands) with which the printer 133 (133a, 133b, 133c, . . . ) used in printing is equipped.

Further, in all of the print systems configured as shown in FIGS. 21 to 23, the image file and print specifying information transmitted from the digital camera 131 to the printer 133 are relayed in the converting server 132.

As will be described later, the print specifying information transmitted from the digital camera 131 to the printer 133 is composed of web-based (web architecture) (user-interface export architecture) data between the digital camera 131 and the converting server 132. The latter executes processing for converting the print specifying information, which is composed of the web-based (web architecture) data, to data having a command architecture (command-based architecture). The print specifying information composed of the data of the command architecture is supplied from the converting server 132 to the printer 133 (via the print server 134 in the print system illustrated in FIGS. 22 and 23).

FIG. 24 illustrates an example of print specifying information possessing a web-based architecture as well as the corresponding print specifying information possessing a command-based architecture. Conversion from the web-based architecture to the command-based architecture is performed in the converting server 132, as described above.

The print specifying information transmitted from the digital camera 131 and possessing the web-based architecture received by the converting server 132 includes the URL (http://xxx.OOO.Δ Δ Δ/print.cgi?frame) of the converting server 132 and print specifying data (=DSCF0001.JPG&pnum=3&psize=A4). The print specifying data (="DSCF0001.JPG&pnum=3&psize=A4") specifies (instructs) that the image of the image file having the file name "DSCF0001.JPG" will be printed on three sheets of paper of size A4.

Upon receiving the print specifying information having the web-based architecture from the digital camera 131, the converting server 132 converts the received print specifying information to print specifying information having the command architecture. In the print specifying information having the command-based architecture shown at the bottom of FIG. 24, the third line "PRT QTY=3" is a command instructing that the number of prints is three, the fourth line "PRT SIZ=A4" is a command instructing that printing is to be performed on printing paper of size A4, and the fifth line "IMG SRC=DSCF0001.JPG" is a command designating the file name of the image file that is to be printed. "JOB START" on the first line and "JOB END" on the sixth line indicate the beginning and end of the commands. The second line "PRT PID=1" is a job ID given for every print job.

Thus, the image file and the print specifying information constituted by the data of the command architecture are supplied from the converting server 132 to the printer 133.

Figure 25:
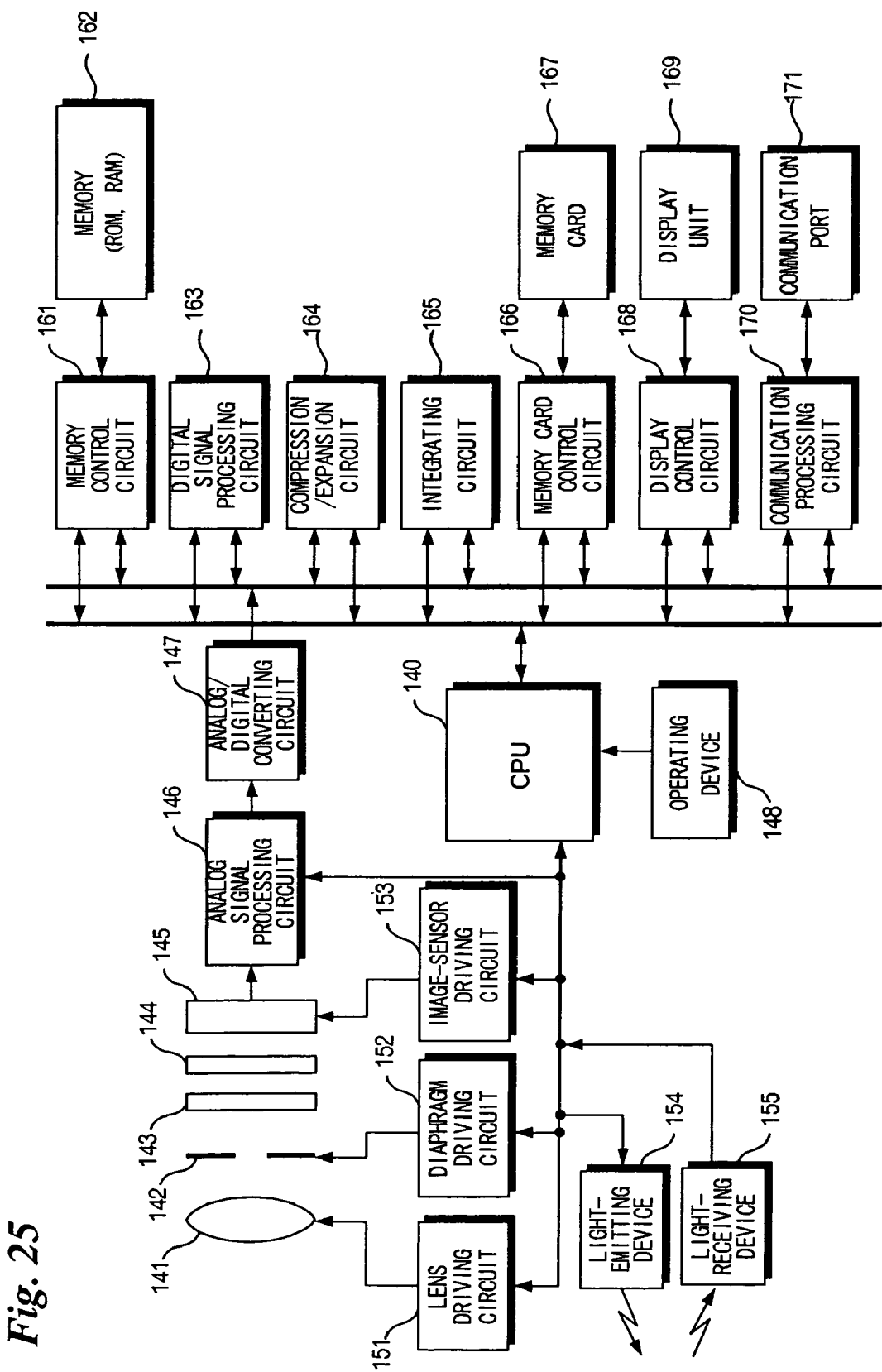
FIG. 25 is a block diagram illustrating the electrical structure of a digital camera.

FIG. 25 is a block diagram illustrating the electrical structure of the digital camera 131.

The digital camera 131 includes a CPU 140 by which the overall digital camera 131 is controlled.

Instructions provided by an operating device (a shutter-release button, dial, etc.) 148 enter the CPU 140. The CPU 140 causes the digital camera 131 to operate based upon the applied instructions.

Connected to the CPU 140 are an analog signal processing circuit 146, a lens driving circuit 151, a diaphragm driving circuit 152, an image-sensor driving circuit 153, a light-emitting device 154 and a light-receiving device 155.

A light image representing a subject is formed on a lens 141. The light image formed impinges upon a solid-state image sensing device 145 via a diaphragm 142, infrared blocking filter 143 and an optical low-pass filter 144. If the shutter-release button is pressed half way, the subject is imaged, i.e., the subject is focused by adjusting the position of the lens by the lens driving circuit 151 and the diaphragm 142 is adjusted by the diaphragm driving circuit 152. If the shutter-release button is pressed fully, the solid-state image sensing device 145 is driven by the image-sensor driving circuit 153 and the light image representing the subject is sensed by the solid-state image sensing device 145. The image signal output from the solid-state image sensing device 145 is subjected to prescribed signal processing in the analog signal processing circuit 146, after which the signal is converted to digital image data in an analog/digital converting circuit 147.

Also connected to the CPU 140 via a bus are a memory control circuit 161 for controlling reading in of data (inclusive of programs) from a memory (ROM or RAM) 162 and writing of data to the memory (RAM) 162; a digital signal processing circuit 163 for applying prescribed digital processing to digital image data; a compression/expansion circuit 164 for compressing digital image data and expanding compressed digital image data; an integrating circuit 165 for calculating an integrated value for white balance; a memory card control circuit 166 for controlling reading in of data from a memory card 167 and writing of data to the memory card 167; a display control circuit 168 for displaying an image on the display screen of a display unit 169; and a communication processing circuit 170 for sending and receiving data via a communication port 171.

Digital image data obtained by image sensing is compressed in the compression/expansion circuit 164 and then recorded on the memory card 167 by the memory card control circuit 166. The digital image data that has been recorded on the memory card 167 is read out of the memory card 167 by the memory card control circuit 166 and expanded by the compression/expansion circuit 164, after which the expanded data is stored temporarily in the memory 162. The image represented by the digital image data stored temporarily in the memory 162 is displayed on the display screen of the display unit 169 by the display control circuit 168. The image data that has been recorded on the memory card 167 can be transmitted to the converting server 132 via the communication processing circuit 170 and communication port 171.

Further, a browser for displaying a web page on the display screen of the display unit 169 has been stored in the memory 162. As a result, the digital camera 131 can cause the browser, which is based upon web data (e.g., HTML data), to be displayed on the display screen of the display unit 169. The web data is sent and received to and from the communication port 171 and communication processing circuit 170.

The converting server 132 and print server 134 are computers each having a CPU, memory, communication device, hard disk and input unit, etc. Data and a program for causing the computer to function as the converting server 132 have been stored on the hard disk of the converting server 132. Data and a program for causing the computer to function as the print server 134 have been stored on the hard disk of the print server 134. The printer 133, which is equipped with a CPU, memory, communication device and printing device, etc., has its commands (or an interpreter for interpreting commands) stored in the memory of the printer 133.

Print processing will now be described taking as an example the print system having the configuration shown in FIG. 21.

Figure 26:
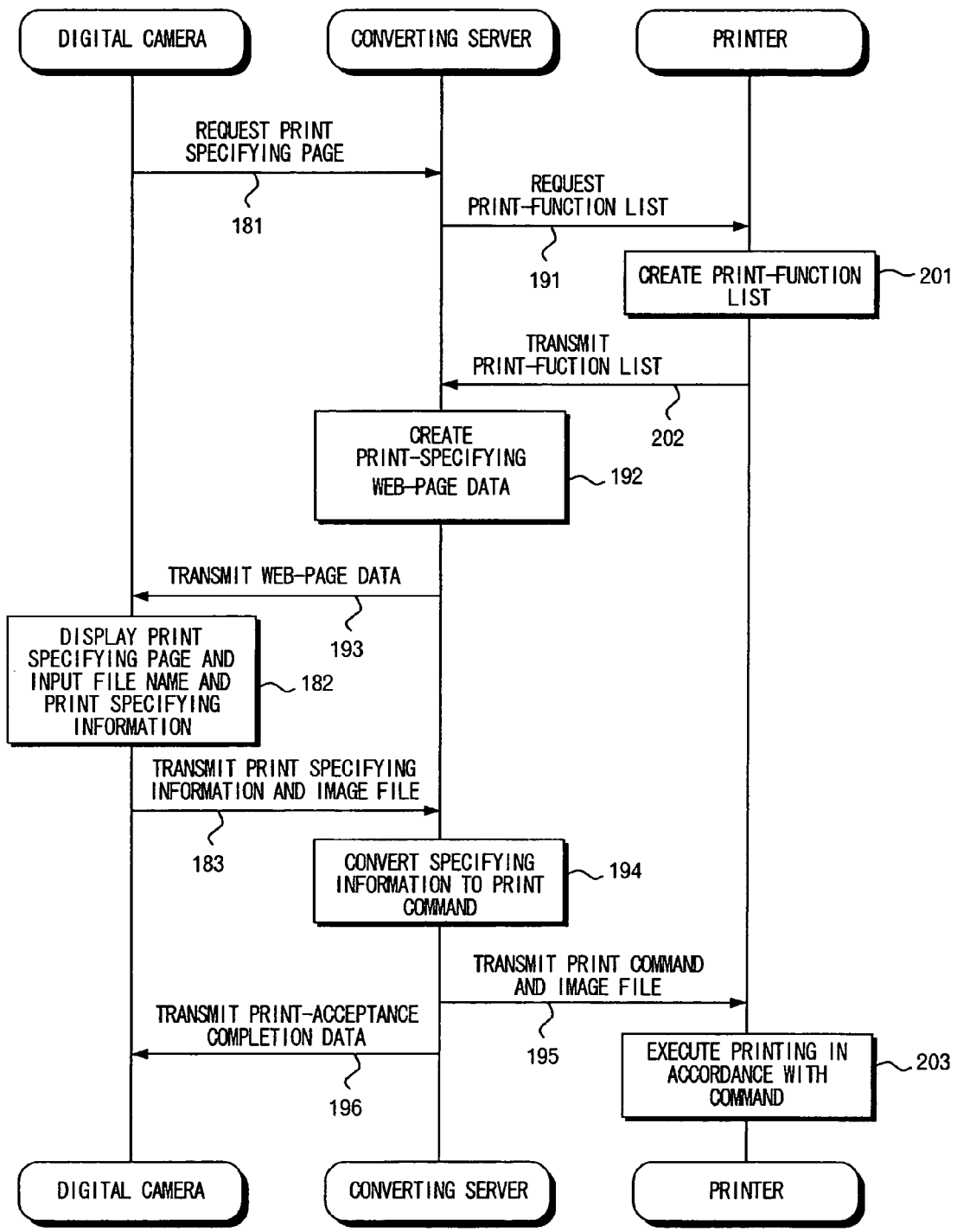
FIG. 26 is a flowchart illustrating processing executed by a digital camera, converting server and printer in print processing.

FIG. 26 is a flowchart illustrating the flow of operation by the digital camera 131 and the flow of operation by the converting server 132 when print processing is executed.

The browser in the digital camera 131 is launched. First, the digital camera 131 transmits a request for a print specifying page to the converting server 132 (step 181).

Upon receiving the request for the print specifying page from the digital camera 131, the converting server 132 sends the printer 133 a request for print-function list data (step 191).

The printer 133 creates (or reads out) the print-function list data based upon commands (a command interpreter) stored in the memory of the printer 133 (step 201) and transmits the print-function list data that has been created to the converting server 132 (step 202). The print-function list data is data that indicates the print functions according to which the printer 133 can be controlled by commands.

For example, assume that printing of one to ten sheets can be specified in the printer 133 and that the printer is capable of printing at postcard size, L size, A4 size or B5 size (and that is possesses such print functions). In this case, the print-function list data would be data indicating that it is possible to specify printing of one to ten sheets and that it is possible to print at postcard size, L size, A4 size or B5 size.

Upon receiving the print-function list data transmitted from the printer 133, the converting server 132 creates print-specifying web-page data based upon the print-function list data received (step 192). The print-specifying web-page data created in the converting server 132 is transmitted to the digital camera 131 (step 193). The print-specifying web page that is based upon the print-specifying web-page data is displayed on the display screen of the display unit 169 of digital camera 131 (step 182).

Figure 28:
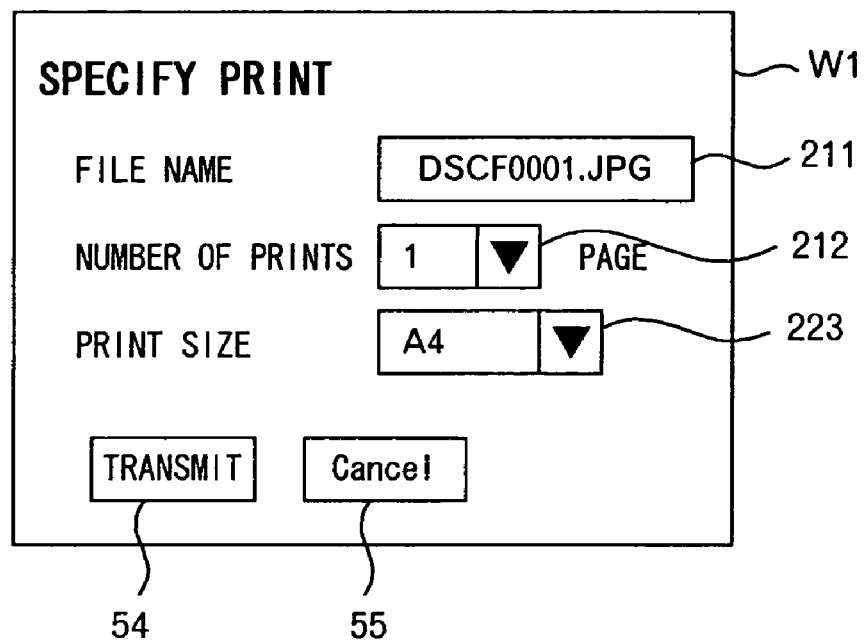
FIG. 28 illustrates an example of print-specifying page.

FIG. 27 illustrates an example of print-specifying web-page data, and FIG. 28 illustrates an example of a print-specifying web page W9 displayed on the display screen of the display unit 169 of digital camera 131 based upon the print specifying web-page data.

The print-specifying web page W9 includes a file-name input area 211, an input area 212 for specifying any number of prints from one to ten, an input area 213 for specifying any print size among postcard size, L size, A4 size and B5 size, a transmit button 214 and a cancel button 215. The file name of an image file to be printed is entered in the file-name input area 211 and the number of prints is entered in the input area 212 for specifying number of prints (a desired numeral is selected from among choices 1 to 10). Print size is entered in the input area 213 for specifying print size (the desired size is selected from the choices postcard, L, A4 and B5).

If the transmit button 214 is clicked (touched) after the file name, the number of prints and the print size have been entered (selected), then the specified image file is read out of the memory card 167 and the image file that has been read out and the print specifying information, namely the data representing the specified number of prints and the data representing the print size, are transmitted from the digital camera 131 to the converting server 132 (step 183).

As described above, the print specifying information transmitted from the digital camera 131 to the converting server 132 possesses a web-based architecture (the upper part of FIG. 24). When the converting server 132 receives the print specifying information having the web-based architecture from the digital camera 131, the converting server 132 converts the received print specifying information to print specifying information having the command architecture (step 194). The print specifying information having the command architecture (the lower part of FIG. 24) and the image file are transmitted from the converting server 132 to the printer 133 (step 195). The image represented by the image file is output from the printer 133 in the number of sheets specified and on the printing paper specified (step 203). After the converting server 132 transmits the print specifying information and image data to the print server 134, the converting server 132 sends the digital camera 131 notification of the fact that transmission has been completed (step 196).

The print-specifying web-page data created in the converting server 132 is created based upon the print-function list display created in the printer 133, as described above. As a result, all of the print functions possessed by the printer 133 can be utilized by the user of the digital camera 131. Further, the print specifying information specified (selected) by the user utilizing the digital camera 131 is converted from data having the browser architecture to data having the command architecture and is applied to the printer 133. As a result, it is unnecessary to prepare the commands in the digital camera 131 in advance.

In a case where a plurality of utilizable printers exist, as shown in FIG. 23, any printer that is to be used in printing is selected from among the utilizable printers 133a, 133b, 133c, . . . . The print-function list data is created in the selected printer to be used in printing and a print-specifying web page is created based upon the print-function list data that has been created. The desired print functions can be specified among the print functions possessed by the selected printer.

In the second embodiment, a print system comprising a digital camera and a printer is taken as an example and in the example described, a controlled apparatus (printer 133) controlled by a command is controlled utilizing a control apparatus (digital camera 131) that does not possess the command.

It goes without saying that this is not limited the relationship between the digital camera 131 and the printer 133. The present invention is applicable to a relationship between a mobile telephone and a household appliance (refrigerator, washing machine, air conditioner, etc.), between a digital camera and a storage device that stores image data, and between a digital camera and a display device (television, etc.).

As many apparently widely different embodiments of the present invention can be made without departing from the spirit and scope thereof, it is to be understood that the invention is not limited to the specific embodiments thereof except as defined in the appended claims.

What is claimed is:

1. A control apparatus utilized in a system constituted by the control apparatus and a controlled apparatus that support both a command-based model and a user-interface export model, comprising:
    a first storage device for storing commands for controlling said controlled apparatus by the command-based model;
    a second storage device for storing control-apparatus support command script representing types of commands that have been stored in said first storage device;
    a receiving device for receiving controlled-apparatus support command script, which represents types of commands executable in said controlled apparatus, transmitted from said controlled apparatus;
    a display control device for displaying types of processing executable by said controlled apparatus on a display unit based upon the controlled-apparatus support command script received by said receiving device;
    a selecting device for accepting input of selection of processing of any type from among the types of processing executable by said controlled apparatus displayed on the display unit by said display control device;
    a determination device for determining, by comparing the control-apparatus support command script that has been stored in said second storage device with the controlled-apparatus support command script that has been received by said receiving device, whether processing that has been selected by said selecting device is processing capable of being executed by the command-based model;
    a command processing control device for causing said controlled apparatus to execute the processing of the selected type by transmitting a command, which corresponds to the processing of the selected type, stored in said first storage device to said controlled apparatus if said determination device has determined that the processing selected by said selecting device is processing that can be executed by the command-based model; and
    a user-interface processing control device for causing said controlled apparatus to execute the processing of the selected type by causing said control apparatus and said controlled apparatus to be operated by the user-interface export model, and transmitting user-interface export data, which corresponds to the processing of the selected type, to said controlled apparatus, if said determination device has determined that the processing selected by said selecting device is processing that cannot be executed by the command-based model.

2. The apparatus according to claim 1, wherein said user-interface processing control device has:
    a device for transmitting page request data from said control apparatus to said controlled apparatus, thereby causing said controlled apparatus to recognize that processing based upon the user-interface export model will be executed; and
    a device for transmitting user-interface export data, which is entered in accordance with a page based upon the page data transmitted from said controlled apparatus to said control apparatus, to said controlled apparatus, thereby causing said controlled apparatus to execute the processing of the type selected.

3. A computer-readable medium, storing a set of instructions, executed by a processor, to perform a method of controlling an apparatus, the method performed in a system constituted by a control apparatus and a controlled apparatus that support both a command-based model and a user-interface export model, the method comprising:
    storing commands for controlling said controlled apparatus by the command-based model in a first storage device;
    storing, in a second storage device, control-apparatus support command script representing types of commands that have been stored in said first storage device;
    receiving controlled-apparatus support command script, which represents types of commands executable in said controlled apparatus, transmitted from said controlled apparatus;
    displaying types of processing executable by said controlled apparatus on a display unit based upon the controlled-apparatus support received command script;
    accepting input of selection of processing of any type from among the types of processing executable by said controlled apparatus displayed on the display unit;
    determining, by comparing the control-apparatus support command script that has been stored in said second storage device with the controlled-apparatus support command script that has been received, whether processing that has been selected is processing capable of being executed by the command-based model;
    causing said controlled apparatus to execute the processing of the selected type by transmitting a command, which corresponds to the processing of the selected type, stored in said first storage device to said controlled apparatus if it has been determined that the selected processing is processing that can be executed by the command-based model; and
    causing said controlled apparatus to execute the processing of the selected type by causing said control apparatus and said controlled apparatus to be operated by the user-interface export model, and transmitting the selected processing to said controlled apparatus by user-interface export data, if it has been determined that the selected processing is processing that cannot be executed by the command-based model.

4. A control system comprising a control apparatus, a converting server and a controlled apparatus for executing processing that is based upon processing-request command data of a command architecture, wherein said controlled apparatus includes a processing function data transmitting device for transmitting data, which represents processing functions capable of being executed by said controlled apparatus, to said converting server;
    said converting server includes:
    a processing function data receiving device for receiving processing function data transmitted from said controlled apparatus;
    a page data generating device for generating data, which represents a web page for selecting processing to be executed by said controlled apparatus, based upon the processing function data received by said processing function data receiving device; and a page data transmitting device for transmitting processing-request selection page data, which has been generated by said page data generating device, to said control apparatus; said control apparatus includes:

a page data receiving device for receiving processing-request selection page data received from said converting server;

a display control device for displaying a processing-request selection page, which is based upon the processing-request selection page data received by said page data receiving device, on a display screen of a display unit;

an input device for accepting input of a processing request selected by using the processing-request selection page displayed on the display screen by said display control device; and a processing-request web data transmitting device for transmitting web data, which represents the selected processing request accepted by said input device, to said converting server; and said selecting server further includes:

a processing-request web data receiving device for receiving processing-request web data transmitted from said control apparatus;

a converting device for converting processing-request web data, which has been received by said processing-request web data receiving device, to data of the command architecture; and a processing-request command data transmitting device for transmitting the processing-request command data, which has been converted by said converting device, to said controlled apparatus.

5. The system according to claim 4, wherein said control apparatus includes a processing-target data transmitting device for transmitting processing-target data, which is to be processed in said controlled apparatus in accordance with the processing-request command data, to said converting server; and said converting server includes:

a processing-target data receiving device for receiving the processing-target data transmitted from said control apparatus; and a processing-target data transmitting device for transmitting the processing-target data, which has been received by said processing-target data receiving device, to said controlled apparatus.

6. A computer comprising:

a processing function data receiving device for receiving data, which represents processing functions capable of being executed by a controlled apparatus, transmitted from said controlled apparatus for executing processing that is based upon processing-request command data of a command architecture;

a page data generating device for generating data, which represents a web page for selecting processing to be executed by said controlled apparatus, based upon the processing function data received by said processing function data receiving device;

a page data transmitting device for transmitting processing-request selection page data, which has been generated by said page data generating device, to said control apparatus;

a processing-request web data receiving device for receiving web data, which represents a processing request selected by using the processing-request selection web page, transmitted from said control apparatus;

a converting device for converting processing-request web data, which has been received by said processing-request web data receiving device, to data of the command architecture; and a processing-request command data transmitting device for transmitting the processing-request command data, which has been converted by said converting device, to said controlled apparatus.

7. A computer comprising:

a receiving device for receiving data, which represents processing functions capable of being executed by a controlled apparatus, transmitted from said controlled apparatus for executing processing that is based upon processing-request command data of a command architecture;

a page data generating device for generating data, which represents a web page for displaying content of processing capable of being executed by said controlled apparatus, based upon the processing function data received by said receiving device; and a page data transmitting device for transmitting processing-content page data, which has been generated by said page data generating device, to a control apparatus.

8. A method of controlling a computer comprising the steps of:

receiving data, which represents processing functions capable of being executed by a controlled apparatus, transmitted from the controlled apparatus for executing processing that is based upon processing-request command data of a command architecture;

generating data, which represents a web page for selecting processing to be executed by the controlled apparatus, based upon the processing function data received;

transmitting the generated processing-request selection page data to the control apparatus;

receiving web data, which represents a processing request selected by using the processing-request selection web page, transmitted from the control apparatus;

converting the received processing-request web data to data of the command architecture; and transmitting the converted processing-request command data to the controlled apparatus.

9. A method of controlling a computer comprising the steps of:

receiving data, which represents processing functions capable of being executed by a controlled apparatus, transmitted from the controlled apparatus for executing processing that is based upon processing-request command data of a command architecture;

generating data, which represents a web page for selecting processing to be executed by the controlled apparatus, based upon the processing function data received; and transmitting the generated processing-request selection page data to the control apparatus.

10. The apparatus of claim 1, wherein the controlled apparatus is a printer and wherein controlled-apparatus support command script includes descriptions related to a name of a printer manufacturer, a printer model name, and a plurality of commands capable of being executed by the printer.

* * * * *